US012655283B2

(12) United States Patent
Ressel et al.

(10) Patent No.: US 12,655,283 B2
(45) Date of Patent: Jun. 16, 2026

(54) AQUEOUS DISPERSIONS CONTAINING CATIONIC POLYVINYL ALCOHOL MODIFIED POLYMER PARTICLES AND AQUEOUS ELECTROCOATING MATERIALS CONTAINING SAID DISPERSIONS

(71) Applicant: BASF COATINGS GMBH, Münster (DE)

(72) Inventors: Joerg Ressel, Münster (DE); Sebastian Flamme, Münster (DE); Janine Juettemeyer, Münster (DE); Dirk Benning, Münster (DE); Noel Urban, Münster (DE); Martin Geuting, Münster (DE); Silke Przybilla, Münster (DE)

(73) Assignee: BASF COATINGS GMBH, Muenster (DE)

( * ) Notice: Subject to any disclaimer, the term of this patent is extended or adjusted under 35 U.S.C. 154(b) by 498 days.

(21) Appl. No.: 18/548,145

(22) PCT Filed: Feb. 17, 2022

(86) PCT No.: PCT/EP2022/053880
§ 371 (c)(1),
(2) Date: Aug. 28, 2023

(87) PCT Pub. No.: WO2022/189111
PCT Pub. Date: Sep. 15, 2022

(65) Prior Publication Data
US 2024/0132710 A1    Apr. 25, 2024
US 2024/0228764 A9    Jul. 11, 2024

(30) Foreign Application Priority Data
Mar. 10, 2021    (EP) .................................... 21161745

(51) Int. Cl.
C08L 29/04      (2006.01)
C08G 59/24      (2006.01)
C08G 59/40      (2006.01)
C08G 59/50      (2006.01)
C09D 5/44       (2006.01)

(52) U.S. Cl.
CPC ............ *C08L 29/04* (2013.01); *C08G 59/245* (2013.01); *C08G 59/4028* (2013.01); *C08G*

*59/50* (2013.01); *C09D 5/4407* (2013.01); *C09D 5/4438* (2013.01); *C08L 2201/54* (2013.01)

(58) Field of Classification Search
CPC ... C08L 29/04; C08L 2201/54; C08G 59/245; C08G 59/4028; C08G 59/50; C09D 5/4407; C09D 5/4438
See application file for complete search history.

(56) References Cited

U.S. PATENT DOCUMENTS 6,235,812 B1 * 5/2001 Reuter ................. C09D 131/04
523/412
6,951,602 B1 10/2005 Reuter et al.

FOREIGN PATENT DOCUMENTS

DE    19930060 A1    1/2001
WO    03074618 A1    9/2003

OTHER PUBLICATIONS

International Search Report for PCT/EP2022/053880 dated May 6, 2022, 3 pages.
Written Opinion for PCT/EP2022/053880 dated May 6, 2022, 6 pages.
Hermann Rompp, "Pigmentpasten", Römpp-Lexikon Lacke und Druckfarben, Georg Thieme Verlag, 1998, pp. 452.

* cited by examiner

*Primary Examiner* — Jiangtian Xu
(74) *Attorney, Agent, or Firm* — Armstrong Teasdale LLP

(57) ABSTRACT

Disclosed herein are an aqueous dispersion including cationic polyvinyl alcohol modified polymer particles, an aqueous electrocoating material containing the dispersion and a process to produce an at least partially coated substrate using the aqueous electrocoating material. The aqueous dispersion can be prepared by reacting an intermediate including at least one polyvinyl alcohol polymer chain with a compound including at least one epoxide group and a least two blocked primary amino groups. Aqueous coating compositions including the aqueous dispersion result in improved leveling properties during film formation as well as an improved edge protection of the substrate without negatively influencing the surface roughness and adhesion as well as the deposition properties.

20 Claims, No Drawings

AQUEOUS DISPERSIONS CONTAINING CATIONIC POLYVINYL ALCOHOL MODIFIED POLYMER PARTICLES AND AQUEOUS ELECTROCOATING MATERIALS CONTAINING SAID DISPERSIONS

CROSS-REFERENCE TO RELATED APPLICATIONS

This application is a U.S. National Phase Application of International Patent Application No. PCT/EP22/53880, filed Feb. 17, 2022, which claims priority to EP patent application Ser. No. 21/161,745.1, filed Mar. 10, 2021, each of which is hereby incorporated by reference herein.

The present invention relates to an aqueous dispersion comprising cationic polyvinyl alcohol modified polymer particles, to aqueous electrocoating materials containing said dispersions and to a process to produce an at least partially coated substrate using said aqueous electrocoating material. The aqueous dispersion can be prepared by reacting an intermediate comprising at least one polyvinyl alcohol polymer chain with a compound comprising at least one epoxide group and a least two blocked primary amino groups. Aqueous coating compositions comprising said aqueous dispersion result in improved leveling properties during film formation as well as an improved edge protection of the substrate without negatively influencing the surface roughness and adhesion as well as the deposition properties.

STATE OF THE ART

A normal requirement within the automobile sector is that the metallic components used for manufacture must be protected against corrosion. The requirements concerning the corrosion prevention to be achieved are very stringent, especially as the manufacturers often give a guarantee against rust perforation over many years. Such corrosion prevention is normally achieved by coating the components, or the substrates used in their manufacture, with at least one coating apt for the purpose, typically an electrodeposition coating.

The electrodeposition process can be anodic or cathodic; typically, the article to be coated serves as the cathode. Electrodeposition processes are advantageous both economically and environmentally due to the high transfer efficiency of coating resin to the substrate and the low levels of organic solvent, if any, that are employed. Another advantage of electrocoat compositions and processes is that the applied coating composition forms a uniform and continuous layer over a variety of metallic substrates regardless of shape or configuration. This is especially advantageous when the coating is applied as an anticorrosive coating onto a substrate having an irregular surface, such as a motor vehicle body. The even and continuous coating layer formed over all portions of the metallic substrate provides maximum anticorrosion effectiveness.

Electrocoating baths typically comprise an aqueous dispersion or emulsion of a film-forming material, such as an epoxy resin, having ionic stabilization. A dispersion is typically a two-phase system of one or more finely divided solids, liquids, or combinations thereof in a continuous liquid medium such as water or a mixture of water and organic cosolvent. An emulsion is a dispersion of liquid droplets in a liquid medium, preferably water or a mixture of water and various cosolvents. Accordingly, an emulsion is a type of dispersion.

For automotive or industrial applications, the electrocoat compositions are formulated to be curable compositions by using self-crosslinking resins or including a crosslinker. During electrodeposition, a coating composition containing an ionically-charged resin is deposited onto a conductive substrate by submerging the substrate in an electrocoating bath having dispersed therein the charged resin and then applying an electrical potential between the substrate and a pole of opposite charge, for example, a stainless-steel electrode. The charged coating particles are plated or deposited onto the conductive substrate and the coated substrate is then heated to cure the coating.

Suitable automotive metals include cold rolled steel ("CRS"), electrogalvanized steel ("EGS"), hot dipped galvanized steel ("HDG"), galvanneal (annealed hot-dipped galvanized steel), aluminum and aluminum alloys, and other zinc-alloy coated metals. To improve adhesion of the electrocoat to the metal surface, the metal is typically treated with a zinc phosphate conversion coating.

Continuing problems with cathodic electrocoating compositions have been the lack of edge protection or edge coverage of the substrate. Said edge protection is normally a compromise of edge coverage and good flow/levelling of surface of the coating film formed after application. It is known in the state of the art to use cationic epoxy microgels in electrocoating compositions to improve the edge coverage especially for higher film build electrocoats in the ASM (automotive supply metal) market, because the presence of these microgels significantly increases the melt viscosity and thereby reduces the flow of the applied coating composition away from the edges of the substrate. This significant increase in melt viscosity, however, does no longer provide a sufficient leveling of the applied coating composition on the substrate and therefore results in a rough coating surface.

It is also known in the state of the art to add water-soluble polyvinyl alcohol polymers to aqueous electrocoating compositions to increase the edge protection. Without wishing to be bound to this theory, the presence of polyvinyl alcohol polymer is believed to result in a flocculation of the inorganic pigments present in the composition after deposition, thereby creating a highly viscous layer close to the substrate which also covers the edges. The edge coverage achieved by said viscous layer is, however, only very thin, and not always sufficient to achieve the desired edge protection.

Of advantage accordingly would be a polymeric resin which can be used in aqueous electrocoating materials as binder and which would result in a higher film thickness at the edges of the substrates, thus leading to improved edge protection. At the same time, said binder should provide a sufficient low viscous melt layer at the coating surface to achieve god flow/leveling properties of the applied coating material. The improvement in edge protection should, however, not result in a negative influence on the storage stability or the deposition process of the electrocoating material.

Object

Accordingly, the object of the present invention is to provide a polymeric resin which can be incorporated in aqueous electrocoating materials and which results in a higher film thickness of the electrocoating material at the edges of the substrate, thus resulting in improved edge coverage. Moreover, cured layers obtained from the aqueous electrocoating material should have sufficient surface smoothness and adhesion to the substrate. Additionally, the aqueous electrocoating materials should have a high storage stability, an adequate particle size, filterability and electro-chemical depositability.

Technical Solution

The objects described above are achieved by the subject matter claimed in the claims and by the preferred embodiments of that subject matter that are described in the description hereinafter.

A first subject of the present invention is therefore an aqueous dispersion (AD) comprising cationic polymer particles, said aqueous dispersion (AD) being obtained by:

a) preparing an aqueous dispersion of intermediate (I1) by reacting a compound (C1) containing at least one free isocyanate group and at least two epoxide groups with
    (i) an aqueous solution of polyvinyl alcohol polymer (C2a-i) or
    (ii) a dispersion of polyvinyl alcohol polymer in an organic solvent S1 (C2a-ii) and subsequent dispersion of intermediate (I1) in water;
  b) reacting the aqueous dispersion of intermediate (I1) obtained in step (a) with a compound (C3) comprising at least one epoxide group and at least two blocked primary amino groups;
  c) optionally diluting the aqueous dispersion with an aqueous solution; and
  d) optionally at least partially removing organic solvents present in the dispersion obtained in step (c),
  wherein at least one acid is present in step a) and/or step b) and/or step c).

The above-specified aqueous dispersion (AD) is hereinafter also referred to as aqueous dispersion of the invention and accordingly is a subject of the present invention. Preferred embodiments of the aqueous dispersion of the invention are apparent from the description hereinafter and from the dependent claims.

In light of the prior art it was surprising and unforeseeable for the skilled worker that the object on which the invention is based could be achieved by covalently attaching a polyvinyl alcohol polymer to a cationic epoxy microgel. The polyvinyl alcohol polymer covalently attached to the cationic epoxy microgel acts as a physical anchor function to the pigment rich layer, thereby fixing the cationic microgel to said layer and resulting in a high film thickness at the edges of the substrate. Additionally, the anchor function keeps the cationic microgel inside the formed coating layer such that a certain stratification having a low viscous melt layer at the coating surface is formed, said stratification being is necessary for good flow and levelling properties. The polyvinyl alcohol polymer functionalized cationic epoxy microgel can be formulated as aqueous dispersion and can be incorporated without any difficulties in aqueous electrocoating compositions as binder. The incorporation of said functionalized microgel does not result in a negative influence on the adhesion of the coating film and cured coating layer as well as on the deposition properties of the electrocoating composition.

A further subject of the present invention is a process for preparing an aqueous dispersion (AD) comprising cationic polymer particles, said process comprising the following steps:

(1) preparing an aqueous dispersion of intermediate (I1) by reacting a compound (C1) containing at least one free isocyanate group and at least two epoxide groups with
    (i) an aqueous solution of polyvinyl alcohol polymer (C2a-i) or
    (ii) a dispersion of polyvinyl alcohol polymer in an organic solvent S1 (C2a-ii) and subsequent dispersion of intermediate (I1) in water;
  (2) reacting the aqueous dispersion of intermediate (I1) obtained in step (1) with a compound (C3) comprising at least one epoxide group and at least two blocked primary amino groups;
  (3) optionally diluting the aqueous dispersion with an aqueous solution; and
  (4) optionally at least partially removing organic solvents present in the dispersion obtained after step (3),
  wherein at least one acid is present in step (1) and/or step (2) and/or step (3).

Another subject of the present invention is an aqueous electrocoating material comprising (A) at least one inventive aqueous dispersion (AD) or at least one aqueous dispersion (AD) prepared according to the inventive process,
  (B) at least one further binder B being different from the cationic polymer particles contained in the aqueous dispersion (AD),
  (C) at least one crosslinker (CL),
  (D) at least one pigment,
  (E) optionally at least one additive, and
  (F) optionally at least one catalyst.

Yet another subject of the present invention is a process for producing an at least partially coated substrate, said process comprising the following steps:

(a) at least partially contacting a substrate with an inventive aqueous electrocoating material (ECM);
  (b) forming a coating film from the aqueous electrocoating material;
  (c) optionally rinsing the coating film formed in step (b) with an aqueous solution (b);
  (d) curing the coating film obtained after step (b) or optionally (c); and
  (e) optionally applying at least one further coating layer and curing said coating layer.

A final subject of the present invention is an at least partially coated substrate obtained by the inventive process.

DETAILED DESCRIPTION

The measurement methods to be employed in the context of the present invention for determining certain characteristic variables can be found in the Examples section. Unless explicitly indicated otherwise, these measurement methods are to be employed for determining the respective characteristic variable. Where reference is made in the context of the present invention to an official standard without any indication of the issue date, the reference is implicitly to that version of the standard, which is valid on the filing date, or, in the absence of any valid version at that point in time, to the last valid version.

All film thicknesses reported in the context of the present invention should be understood as dry film thicknesses. It is therefore the thickness of the cured film in each case. Hence, where it is reported that a coating material is applied at a particular film thickness, this means that the coating material is applied in such a way as to result in the stated film thickness after curing.

All temperatures elucidated in the context of the present invention should be understood as the ambient temperature of the room in which the substrate or the coated substrate is located. It does not mean, therefore, that the substrate itself is required to have the temperature in question.

Inventive Aqueous Dispersion:

The inventive aqueous dispersion contains cationic polymer particles, in which the polymer is present in the form of comparatively small discrete particles, or discrete microparticles. Said microparticles are preferably at least partly intramolecularly crosslinked. The latter means that the polymer structures present within a particle correspond to a typical macroscopic network with a three-dimensional network structure.

The cationic polymer particles preferably represent structures which lie between branched and macroscopically crosslinked systems and therefore combine, consequently, the characteristics of macromolecules having a network structure and being soluble in suitable organic solvents, and of insoluble macroscopic networks. Therefore, the fraction of the crosslinked polymers can only be determined, for example, after isolation of the solid polymer after removal of water and any organic solvents, and subsequent extraction of the polymer fraction not being intramolecularly crosslinked. The phenomenon utilized here is that the microgel particles, originally soluble in suitable organic solvents, retain their inner network structure after isolation, and behave, in the solid, like a macroscopic network.

The expression "aqueous" is known in this context to the skilled person. It refers fundamentally to a system which comprises as its dispersion medium not exclusively or primarily organic solvents (also called solvents); instead, it comprises as its dispersion medium a significant fraction of water. Preferred embodiments of the aqueous character, defined on the basis of the maximum amount of organic solvents and/or on the basis of the amount of water, are described later on below.

The aqueous dispersion (AD) is obtained by reacting an aqueous dispersion of an intermediate (I1) comprising polyvinyl alcohol polymer groups with a compound (C3) comprising at least one epoxide and at least two blocked primary amino groups. Upon dilution with water, the blocked primary amino groups are unblocked, thus resulting in cationic polymer particles. Said cationic polymer particles are at least partially neutralized with at least one acid in order to facilitate dispersion of the cationic particles in water.

Aqueous Dispersion of Intermediate (I1):

The aqueous dispersion of the intermediate (I1) comprising polyvinyl alcohol polymer groups can be prepared by (a) reacting an aqueous solution of polyvinyl alcohol polymer (C2a-i) with a compound (C1) containing free isocyanate and epoxy groups or by (b) reacting a dispersion of polyvinyl alcohol polymer in an organic solvent (C2a-ii) with compound (C1) and subsequent dispersion of the prepared intermediate (I1) in water (step (a)). With particular preference, the aqueous dispersion of intermediate (I1) is prepared according to alternative (a), i.e. by reacting an aqueous solution of polyvinyl alcohol polymer (C2a-i) with compound (C1), in particular in the presence of at least one acid described in detail below. Use of aqueous dispersions (AD) being prepared from these intermediates (I1) in aqueous electrocoating materials results to a reduced surface roughness and improved edge coverage of substrates being coated with said aqueous electrocoating material.

Preferred compounds (C1) contain exactly one free isocyanate group and exactly two epoxide groups. Such compounds (C1) may have an epoxy equivalent weight (EEW) of 300 to 700 g/Eq., preferably 350 to 650 g/Eq., more preferably 400 to 600 g/Eq., even more preferably 450 to 550 g/Eq., very preferably 500 to 530 g/Eq., as determined according to DIN EN ISO 3001:1999-11.

Suitable compounds (C1) useful for preparation of the aqueous intermediate (I1) can be obtained by reacting at least one compound (C1-1) containing at least two epoxide groups, in particular at least three epoxide groups, with at least one compound (C1-2) containing at least one amine group and the resulting product is further reacted with at least one compound (C1-3) containing at least two free isocyanate groups.

With particular preference, compound (C1-1) is a reaction product of propoxylated pentaerythritol and epichlorohydrin.

Suitable amine group containing compounds (C1-2) may be selected from secondary amines, preferably from $C_1$-$C_{10}$ dialkyl amines, more preferably from $C_2$-$C_6$ dialkyl amines, very preferably from $C_3$ dialkyl amines.

The compound (C1-3) containing at least 2 free isocyanate groups is preferably selected from cycloaliphatic, aliphatic-cycloaliphatic, aromatic, aliphatic-aromatic and/or cycloaliphatic-aromatic diisocyanates, dimers and trimers of the stated diisocyanates and mixtures thereof, preferably aliphatic diisocyanates, such as hexamethylene diisocyanate, isophorone diisocyanate (IPDI), dicyclohexylmethane 4,4'-diisocyanate, 2,4- or 2,6-diisocyanato-1-methylcyclohexane, and m-tetramethylxylylene diisocyanate (m-TMXDI), very preferably isophorone diisocyanate.

The compounds (C1-1), (C1-2) and (C1-3) may be reacted in a molar ratio of 1:5:5 to 1:1:1, preferably 1:3:3 to 1:1:1, very preferably 1:1:1.

In the context of the present invention, the term "polyvinyl alcohol polymer" refers to a random copolymer or block copolymer comprising polymer building blocks of the general formula (I), or a homopolymer consisting of polymer building blocks of the general formula (I)

$$-[-C(R^1)-C(R^1)(OH)-]-\qquad\text{(I).}$$

The polyvinyl alcohol polymers being of advantage in accordance with the invention and therefore being employed with preference. The polymer building blocks of formula (I) may be linked head to head or head to tail. Advantageously, by far the predominant proportion of the polymer building blocks of formula (I) are linked head to tail.

The residue $R^1$ in formula (I) is selected from hydrogen atoms or from substituted or unsubstituted alkyl, cycloalkyl, alkylcycloalkyl, cycloalkylalkyl, aryl, alkylaryl, cycloalkylaryl, arylalkyl or arylcycloalkyl radicals.

Examples of suitable alkyl radicals are methyl, ethyl, propyl, isopropyl, n-butyl, isobutyl, tert-butyl, amyl, hexyl, and 2-ethylhexyl. Examples of suitable cycloalkyl radicals are cyclobutyl, cyclopentyl, and cyclohexyl. Examples of suitable alkylcycloalkyl radicals are methylenecyclohexane, ethylenecyclohexane, and propane-1,3-diylcyclohexane. Examples of suitable cycloalkylalkyl radicals are 2-, 3- and 4-methyl-, -ethyl-, -propyl-, and -butylcyclohex-1-yl. Examples of suitable aryl radicals are phenyl, naphthyl, and biphenylyl. Examples of suitable alkylaryl radicals are ethylene- and propane-1,3-diyl-benzene. Examples of suitable cycloalkylaryl radicals are 2-, 3-, and 4-phenylcyclohex-1-yl. Examples of suitable arylalkyl radicals are 2-, 3- and 4-methyl-, -ethyl-, -propyl-, and -butylphen-1-yl. Examples of suitable arylcycloalkyl radicals are 2-, 3-, and 4-cyclohexylphen-1-yl.

The above-described radicals $R^1$ may be substituted. Electron-withdrawing or electron-donating atoms or organic radicals may be used for this purpose. Examples of suitable substituents are halogen atoms, especially chlorine or fluorine, nitrile groups, nitro groups, partly or fully halogenated, especially chlorinated and/or fluorinated, alkyl, cycloalkyl, alkylcycloalkyl, cycloalkylalkyl, aryl, alkylaryl, cycloalkylaryl, arylalkyl and arylcycloalkyl radicals, including those exemplified above, especially tert-butyl; aryloxy, alkyloxy and cycloalkyloxy radicals, especially phenoxy, naphthoxy, methoxy, ethoxy, propoxy, butyloxy or cyclohexyloxy; arylthio, alkylthio and cycloalkylthio radicals, especially phenylthio, naphthylthio, methylthio, ethylthio, propylthio, butylthio or cyclohexylthio; hydroxyl groups; and/or primary, secondary and/or tertiary amino groups, especially amino, N-methylamino, N-ethylamino, N-propylamino, N-phenylamine, N-cyclohexylamino, N, N-dimethylamino, N, N-diethylamino, N,N-dipropylamino, N,N-diphenylamino, N,N-dicyclohexylamino, N-cyclohexyl-N-methylamino or N-ethyl-N-methylamino.

It is of advantage in accordance with the invention if the radicals $R^1$ comprise predominantly hydrogen atoms, i.e., if the other radicals $R^1$ are present only to a minor extent. In the context of the present inventions, the term "minor extents" designates an extent which advantageously varies and does not impair or even completely alter the profile of performance properties of the polyvinyl alcohol polymers, especially their solubility in water. Particular advantages result if the radicals $R^1$ comprise exclusively hydrogen atoms, i.e., if the polymer building blocks of formula (I) are derived from the hypothetical polyvinyl alcohol. Accordingly, polyvinyl alcohol polymers containing these polymer building blocks are used with particular preference.

Besides the polymer building blocks of general formula (I), the polyvinyl alcohol polymers for use in accordance with the invention further comprise, in particular, polymer building blocks of the general formula (II)

$$—[—C(R^2)—C(R^2)(OC(O)R^3)—]\qquad\text{(II).}$$

In general formula (II), the radicals $R^2$ have the definition as indicated above in connection with residue $R^1$, hydrogen atoms again being of particular advantage and therefore being employed with particular preference.

The radicals $R^3$ stand for alkyl radicals having from one to ten carbon atoms, preferably methyl, ethyl, propyl, isopropyl, n-butyl, isobutyl, tert-butyl, amyl, hexyl, or 2-ethylhexyl, with particular preference methyl. Accordingly, the particularly preferred polymer building blocks of general formula (II) are derived from vinyl acetate. The polymer building blocks II may be linked head to head or head to tail. Advantageously, by far the predominant proportion of the polymer building blocks of general formula (II) are linked head to tail.

Polyvinyl alcohol polymers comprising building blocks of general formulas (I) and (II) are used within the present invention with particular preference.

The polyvinyl alcohol polymers may further comprise customary and known ethylenically unsaturated monomers such as (meth)acrylic esters substantially free from acid groups,
monomers which carry at least one hydroxyl group per molecule and are substantially free from acid groups, such as hydroxyalkyl esters of acrylic acid, methacrylic acid or another alpha,beta-olefinically unsaturated carboxylic acid which are derived from an alkylene glycol which is esterified with the acid or are obtainable by reacting the alpha,beta-olefinically unsaturated carboxylic acid with an alkylene oxide,
monomers which carry per molecule at least one acid group which can be converted into the corresponding acid anion group, vinyl esters of alpha-branched monocarboxylic acids having from 5 to 18 carbon atoms in the molecule,
reaction products of acrylic acid and/or methacrylic acid with the glycidyl ester of an alpha-branched monocarboxylic acid having from 5 to 18 carbon atoms per molecule,
cyclic and/or acyclic olefins such as ethylene, propylene, but-1-ene, pent-1-ene, hex-1-ene, cyclohexene, cyclopentene, norbornene, butadiene, isoprene, cyclopentadiene and/or dicyclopentadiene, especially ethylene,
(meth)acrylamides,
monomers containing epoxide groups, such as the glycidyl esters of ethylenically unsaturated carboxylic acids,
vinylaromatic hydrocarbons,
nitriles,
vinyl compounds, especially vinyl halides and/or vinylidene dihalides, N-vinylpyrrolidone or vinyl ethers, and
allyl compounds, especially allyl ethers and allyl esters.

Where these monomers are used, they are present only in a minor extent in the polyvinyl alcohol polymers, this term being employed here again in the sense explained above. Of these monomers, the acyclic olefins, especially ethylene and propylene, in particular ethylene, offer particular advantages and are therefore used with preference where needed.

Advantageously, the polyvinyl alcohol polymers have a degree of polymerization of from 100 to 20,000, preferably from 200 to 15,000, with particular preference from 300 to 12,000, and in particular from 400 to 10,000.

The amount of polymer building blocks of general formula (I) in the polyvinyl alcohol polymers is advantageously from 50 to 99.9 mol %, more preferably from 60 to 99.9 mol %, even more preferably from 70 to 99 mol % and very preferably from 80 to 99 mol %.

In the context of the present invention, the polyvinyl alcohol polymers which comprise the particularly advantageous polymer building blocks of general formulas (I) and (II) offer very particular advantages and are therefore used with very particular preference in accordance with the invention. These polyvinyl alcohol polymers are also referred to for short by those in the art as polyvinyl alcohols.

As is known, the polyvinyl alcohols are not accessible through direct polymerization processes but instead are prepared by way of polymer-analogous reactions by hydrolysis of polyvinyl acetate. Particularly advantageous, commercially customary polyvinyl alcohols have molecular weights of from 10,000 to 500,000 Da, preferably from 15,000 to 320,000 Da, and in particular from 20,0000 to 300,000 Da.

With particular preference, the polyvinyl alcohol polymer has a viscosity at 20° C. of at least 2 mPa*s, preferably of 2 to 60 mPa*s, more preferably 10 to 60 mPa*s, even more preferably 30 to 50 mPa*s, very preferably 45 to 49 mPa*s, as determined at a concentration of 4 wt. % in water according to DIN 53015:2018-07.

Preferred polyvinyl alcohol polymers have a degree of hydrolysis of 70 to 100 mol %, preferably 70 to 95 mol %, very preferably 86 to 89 mol %.

The aqueous solution (C2a-i) preferably contains 5 to 15 wt. % polyvinyl alcohol polymer, preferably 5 to 10 wt. % polyvinyl alcohol polymer, and 85 to 95 wt. %, preferably 90 to 95 wt. % of water, based in each case on the total weight of the aqueous solution (C2a-i). With particular preference, the aqueous solution (C2a-i) contains 5 or 10 wt. % of polyvinyl alcohol polymer and 90 to 95 wt. % of water, based in each case on the total weight of the aqueous solution (C2a-i).

Compound (C1) may be reacted with compound (C2a-i) in a ratio of 1:10 to 10:1, preferably 1:10 to 2:1, very preferably 1:10 to 1:1, each ratio being based on the solid content of compounds (C1) and (C2a-i).

If the aqueous dispersion of intermediate (I1) is prepared according to alternative (b) described previously, the dispersion (C2a-ii) preferably contains 50 to 60 wt. % polyvinyl alcohol polymer and 40 to 50 wt. % of at least one organic solvent S1, based in each case on the total weight of the dispersion (C2a-ii).

In this regard, suitable organic solvents S1 are selected from aliphatic and/or aromatic hydrocarbons, ketones, esters, amides, methylal, butylal, 1,3-dioxolane, glycerol formal, hydrocarbons and mixtures thereof, preferably ketones, very preferably methyl isobutyl ketone.

Compound (C1) may be reacted with compound (C2a-ii) in a weight ratio of 1:20 to 1:10, preferably 1:17 to 1:15. Compound (C3):

The aqueous dispersion of intermediate (I1) is reacted with a compound (C3) comprising at least one epoxide group and at least two blocked primary amino groups (step (b)). With particular preference, at least one acid is present during said reaction.

Suitable compounds (C3) can be obtained by reacting at least one compound (C3-1) containing at least one epoxide group with at least one compound (C3-2) containing at least one aromatic group and at least two hydroxyl groups in the presence of at least one solvent S2 and the resulting product is further reacted with at least one polyamine (C3-3) containing at least two blocked primary and at least one free secondary amino group.

Preferred compounds (C3-1) have an epoxy equivalent weight (EEW) of 100 to 300 g/Eq., more preferably 150 to 250 g/Eq., very preferably 170 to 200 g/Eq., as determined according to DIN EN ISO 3001:1999-11, and/or a viscosity at 20° C. of 30,000 to 50,000 mPa*s, very preferably 35,000 to 37,000 mPa*s, as determined according to DIN EN ISO12058-1:2018-11.

Suitable compounds (C3-2) are selected from compounds in which at least one hydroxyl group, preferably both hydroxyl groups, are directly attached to at least one aromatic moiety. With particular preference, compound (C3-2) is selected from bisphenol A.

In order to facilitate reaction between compounds (C3-1) and (C3-2), it may be advantageous to use at least one catalyst. A particular preferred catalyst is triphenyl phosphine.

The product obtained by reacting compounds (C3-1) and (C3-2) preferably has an epoxy equivalent weight (EEW) of 800 to 2,000 g/Eq., more preferably 900 to 1,500 g/Eq., very preferably 980 to 1,100 g/Eq., as determined according to DIN EN ISO 3001:1999-11.

Compounds (C3-1), (C3-2) and (C3-3) may be reacted in a molar ratio of 10:6:1 to 7:4:1.

The at least one solvent S2 being present during the reaction of compound (C3-1) with (C3-2) may be selected from aliphatic and/or aromatic hydrocarbons, ketones, esters, alcohols, amides, methylal, butylal, 1,3-dioxolane, glycerol formal and mixtures thereof, preferably alcohols, very preferably phenoxy propanol and/or isobutanol.

The polyamine (C3-3) has an amine equivalent of 120 to 130 g/Eq. The amine equivalent can be determined, for example, as described in the Example section. The term "polyamine" refers, in the context of the present invention, to compounds comprising at least two primary and at least one secondary amine group. Said amine groups may be present as free amine groups or may be present in blocked form.

Blocked amino groups, as is known, are those in which the hydrogen residues on the nitrogen that are present in free amino groups have been substituted by reaction with a blocking agent. Such blocked amino groups can no longer participate in condensation reactions or addition reactions as is possible for free amino groups. These reactions are only enabled after the blocking agent has been removed to produce the free amino group. The principle therefore resembles the principle of capped or blocked isocyanates, which are likewise known within the field of polymer chemistry.

With particular preference, the polyamine (C3-3) is obtained by reacting a polyamine (A) with at least one blocking agent (BA). With particular preference, the primary amino groups of the polyamine are blocked with at least one blocking agent that is known per se, as for example with ketones and/or aldehydes. Reaction of primary amines with such blocking agent produces ketimines and/or aldimines upon release of water. Said ketimines and/or aldimines no longer contain any nitrogen-hydrogen bonds, meaning that typical condensation reactions or addition reactions of the amino group with a further functional group, such as an isocyanate group, are unable to take place.

Reaction conditions for the preparation of a blocked primary amine of this kind, such as of a ketimine, for example, are known. Thus, for example, such blocking may be realized with introduction of heat to a mixture of a primary amine with an excess of a ketone which functions at the same time as a solvent for the amine. The water of reaction formed is preferably removed during the reaction, in order to prevent the possibility otherwise of reverse reaction (deblocking) of the reversible blocking.

The reaction conditions for deblocking of blocked primary amino groups are also known per se. For example, simply the transfer of a blocked amine to the aqueous phase is sufficient to shift the equilibrium back to the side of the deblocking, as a result of the concentration pressure that then exists, exerted by the water, and thereby to generate free primary amino groups and also a free ketone, with consumption of water.

Suitable blocking agents (BA) may be selected from acetone, methyl ethyl ketone, methyl isobutyl ketone, diisopropyl ketone, cyclopentanone, cyclohexanone or mixtures thereof, preferably methyl ethyl ketone and/or methyl isobutyl ketone. Preferred blocking agents are ketones and with particular such ketones, which can be used as solvents for the reaction product of compounds (C3-1) and (C3-2). It has already been indicated above that the preparation of corresponding primary amines blocked with a ketone proceeds to particularly good effect in an excess of the ketone. Through the use of ketones for the blocking, therefore, it is possible to use the correspondingly preferred preparation procedure for blocked amines, without any need for costly and inconvenient removal of residual blocking agent. Instead, the solution obtained during preparation of polyamine (C3-3) can be used directly to prepare the compound (C3) without removal of residual blocking agent (BA) being present in the polyamine solution (C3-3).

The preferred blocking with ketones and/or aldehydes, more particularly ketones, and the accompanying preparation of ketimines and/or aldimines, has the advantage, moreover, that primary amino groups are blocked selectively. Secondary amino groups present are evidently unable to be blocked, and therefore remain free. Consequently a polyamine (C3-C) which as well as the two blocked primary amino groups also contains one or two free secondary amino groups can be prepared readily by way of the stated preferred blocking reactions from a corresponding polyamine (A) which contains free secondary and primary amino groups.

The polyamines (C3-3) may be prepared by blocking the primary amino groups of polyamines (A) containing two primary amino groups and at least one secondary amino group. Ultimately suitable are all aliphatic, aromatic, or araliphatic (mixed aliphatic-aromatic) polyamines (A) which are known per se and which have two primary amino groups and at least one secondary amino groups. This means that as well as the stated amino groups, there may per se be any aliphatic, aromatic, or araliphatic groups present. Possible, for example, are monovalent groups located as terminal groups on a secondary amino group, or divalent groups located between two amino groups. The term "aliphatic" in the context of the present invention refers to all organic groups which are not aromatic. For example, the groups present as well as the stated amino groups may be aliphatic hydrocarbon groups, in other words groups which consist exclusively of carbon and hydrogen and which are not aromatic. These aliphatic hydrocarbon groups may be linear, branched, or cyclic, and may be saturated or unsaturated. These groups may of course also include both cyclic and linear or branched moieties. It is also possible for aliphatic groups to contain heteroatoms, more particularly in the form of bridging groups such as ether, ester, amide and/or urethane groups. Possible aromatic groups are likewise known and require no further elucidation.

Preferably, polyamine (C3-3) possesses three or four amino groups, these groups being selected from the group consisting of the blocked primary amino groups and of free secondary amino groups. Especially preferred polyamines (C3-3) are those which consist of two blocked primary amino groups, one secondary amino groups, and also aliphatically saturated hydrocarbon groups. The term "blocked primary amino groups" is used within the present invention if at least 95 mol % of all primary amino groups being present in polyamine (A) have been blocked by reaction with the blocking agent (BA) previously listed (determinable by IR spectroscopy; see Example section).

Examples of preferred polyamines (A) from which polyamines (C3-3) may be prepared by blocking of the primary amino groups are diethylenetriamine, 3-(2-aminoethyl)aminopropylamine, dipropylene-triamine, N1-(2-(4-(2-aminoethyl)piperazin-1-yl)ethyl)ethane-1,2-diamine (one secondary amino group, two primary amino groups for blocking), triethylenetetramine, N,N'-bis(3-aminopropyl) ethylenediamine (two secondary amino groups, two primary amino groups for blocking) and mixtures thereof, very preferably from diethylenetriamine.

As previously stated, the polyamine (C3-3) is reacted with the product obtained from reaction of compounds (C3-1) and (C3-2) (denoted as product (C3-1/2) hereinafter). The preparation of the compound (C3) thus involves the reaction of the product (C3-1/2) with the polyamine (C3-3) by addition reaction of epoxide groups of product (C3-1/2) with the free secondary amino group of polyamine (C3-3). This reaction, which is known per se, then leads to the attachment of the polyamine (C3-3) to the polymer (C3-1/2) by ring opening of the epoxide groups to from compound (C3). It will be readily apparent that in the preparation of compound (C3), preference is thus given to not using any other amines having free or blocked primary or secondary amino groups.

The compound (C3) can be prepared by known and established techniques in bulk or solution, especially preferably by reaction of (C3-1/2) with (C3-3) in organic solvents. Said solvents are selected from commonly used organic solvents, preferably from isobutanol and methyl isobutyl ketone.

Aqueous Dispersion (AD):

After reacting the aqueous dispersion of intermediate (I1) with compound (C3), the obtained dispersion can be diluted with an aqueous solution (step (c)). Said aqueous solution can contain at least one acid and/or auxiliaries such as typical emulsifiers and protective colloids.

The at least one acid being present in step (a) and/or (b) and/or (c) is preferably selected from organic acids. Suitable organic acids are, for example, carboxylic acids, sulfonic acids and phosphonic acids. With preference, carboxylic acids are used. Examples of suitable carboxylic acids include lactic acid, acetic acid, formic acid, citric acid, oxalic acid, uric acid, malic acid, and tartaric acid. With particular preference, acetic acid is used in step (a) and/or (b) and/or (c).

Moreover, organic solvents being present in the aqueous dispersion (AD) can be at least partially removed. The removal of the at least one organic solvent may be accomplished in any way which is known, as for example by vacuum distillation at temperatures slightly raised relative to room temperature, of 30 to 60° C., for example.

The cationic polymer particles being present in the aqueous dispersion (AD) preferably have an average particle size (z-mean) of 100 to 1,000 nm, more preferably of 100 to 700 nm, even more preferably of 100 to 600 nm, very preferably of 100 to 400 nm, as determined according to DIN EN ISO 22412:2018-09.

The fraction of the cationic polymer particles in the aqueous dispersion (AD) is preferably 15 to 40 wt. %, very preferably 20 to 30 wt. %, based in each on the total weight of the aqueous dispersion (AD). This fraction can be, for example, determined via the solid content of the aqueous dispersion (AD) as described in the Example section.

The total amount of water in the aqueous dispersion is preferably from 60 to 85 wt. %, very preferably 70 to 80 wt. %, based in each on the total weight of the aqueous dispersion (AD).

The total fraction of cationic polymer particles and water in the aqueous dispersion (AD) is preferably at least 90 wt. %, preferably at least 95 wt. %, very preferably at least 98 wt. %, based in each on the total weight of the aqueous dispersion. The fraction of cationic polymer particles and water can be determined by adding up the amount of particles (determined, for example by the solid content as previously described) and the amount of water. Despite the low fraction of further components, such as organic solvents, the aqueous dispersions (AD) show a high storage stability. Moreover, the low amount of solvents being present in said dispersions (AD) allow to add additional fractions of organic solvents that are necessary to formulate the electrocoating material without significantly increasing the overall VOC of the aqueous electrocoating material.

Inventive Process to Produce the Aqueous Dispersion:

A further aspect of the present invention is a process for preparing an aqueous dispersion (AD) comprising cationic polymer particles, said process comprising the following steps:

(1) preparing an aqueous dispersion of intermediate (I1) by reacting a compound (C1) containing at least one free isocyanate group and at least two epoxide groups with (i) an aqueous solution of polyvinyl alcohol polymer (C2a-i) or (ii) a dispersion of polyvinyl alcohol polymer in an organic solvent S1 (C2a-ii) and subsequent dispersion of intermediate (i1) in water;

(2) reacting the aqueous dispersion of intermediate (I1) obtained in step (1) with a compound (C3) comprising at least one epoxide group and at least two blocked primary amino groups;

(3) optionally diluting the aqueous dispersion with an aqueous solution; and (4) optionally at least partially removing organic solvents present in the dispersion obtained after step (3), wherein at least one acid is present in step (1) and/or step (2) and/or step (3).

With respect to preferred embodiments of compounds used in the inventive process and steps performed according to the inventive process, reference is made to the inventive aqueous dispersion (AD). What has been said about the inventive aqueous dispersion therefore applies mutatis mutandis with respect to further preferred Embodiments of the Inventive Method.

Inventive Aqueous Electrocoating Composition:

The inventive aqueous dispersion (AD) is used to prepare an aqueous electrocoating material. Thus, a further aspect of the present invention is an aqueous electrocoating material (ECM), comprising:

(A) at least one inventive aqueous dispersion (AD) or at least one aqueous dispersion (AD) prepared according to the inventive process, (B) at least one further binder B being different from the cationic polymer particles contained in the aqueous dispersion (AD), (C) optionally at least one crosslinker (CL), (D) at least one pigment, (E) optionally at least one additive, and (F) optionally at least one catalyst.

"Aqueous electrocoating material (ECM)" in the context of the present invention should be understood preferably to mean that the electrocoating material comprises a water fraction of at least 20 wt. %, preferably at least 25 wt. %, very preferably at least 50 wt. %, based in each case on the total amount of the solvents present (that is, water and organic solvents). The water fraction is preferably 70 to 100 wt. %, more particularly 75 to 100 wt. %, very preferably 80 to 100 wt. %, based in each case on the total amount of the solvents present.

Aqueous Dispersion (AD):

The electrocoating material preferably comprises the aqueous dispersion (AD) previously described in a total amount of 0.5 to 20 wt. %, more preferably of 1 to 15 wt. %, even more preferably of 1.5 to 10% by weight, very preferably of 2 to 4 wt. %, based in each case on the total weight of the aqueous electrocoating material (ECM).

Binder B being Different from Cationic Particles in the Aqueous Dispersion (AD):

The term "binder" in the sense of the present invention and in agreement with DIN EN ISO 4618 (German version, date: March 2007), refers preferably to those nonvolatile fractions of the composition of the invention that are responsible for forming the film, with the exception of any pigments and fillers therein, and more particularly refers to the polymeric resins which are responsible for film formation. The nonvolatile fraction may be determined by the method described in the Examples section.

The binder B may be self-crosslinking and/or externally crosslinking. Self-crosslinking binders B contain reactive functional groups which are able to undergo thermal crosslinking reactions with themselves and/or with complementary reactive functional groups in the self-crosslinking binders B. In contrast, externally crosslinking binders B contain reactive functional groups which are able to undergo thermal crosslinking reactions with complementary reactive functional groups in crosslinker CL. Suitable reactive functional groups of externally crosslinking binders B are hydroxyl groups, thiol groups, and primary and secondary amino groups, especially hydroxyl groups. Suitable complementary reactive functional groups present in the crosslinker CL or—in case of self-crosslinking binders—in the binder B, are blocked isocyanate groups, hydroxymethylene and alkoxymethylene groups, preferably methoxymethylene and butoxymethylene groups, and especially methoxymethylene groups. Preference is given to using externally crosslinking binders having hydroxyl groups.

The amount of the at least one binder B in the electrocoating materials of the invention is guided in particular by its solubility and its dispersibility in the aqueous medium as well as by its functionality with regard to the crosslinking reactions with itself or with the crosslinker CL, and may therefore be determined readily be the skilled worker on the basis of his or her general art knowledge. Preferably, the at least one binder B is present in a total amount of 50 to 90 wt. %—based on solid content of the electrocoating material (ECM).

The at least one binder B preferably contains potentially cationic groups and/or cationic groups. Examples of suitable potentially cationic groups which can be converted into cations by neutralizing agents and/or quaternizing agents are primary, secondary, or tertiary amino groups, secondary sulfide groups or tertiary phosphine groups, especially tertiary amino groups, or secondary sulfide groups. Examples of suitable cationic groups are primary, secondary, tertiary, or quaternary ammonium groups, tertiary sulfonium groups or quaternary phosphonium groups, preferably quaternary ammonium groups or tertiary sulfonium groups, but especially quaternary ammonium groups. Examples of suitable neutralizing agents for the potentially cationic groups are inorganic and organic acids such as sulfuric acid, hydrochloric acid, phosphoric acid, formic acid, acetic acid, lactic acid, dimethylolpropionic acid or citric acid, especially formic acid, acetic acid, or lactic acid.

Examples of suitable binders B containing potentially cationic or cationic groups are resins containing primary, secondary, tertiary, or quaternary amino or ammonium groups and/or tertiary sulfonium groups and having amine numbers of preferably between 20 and 250 mg KOH/g and a weight-average molecular weight of from 300 to 10,000 Daltons. In particular, use is made of amino (meth)acrylate resins, amino epoxy resins, amino epoxy resins with terminal double bonds, amino epoxy resins with primary and/or secondary hydroxyl groups, amino polyurethane resins, amino-containing polybutadiene resins or modified epoxy resin-carbon dioxide-amine reaction products.

Alternatively, the binder B may comprise anionic and/or potentially anionic groups. Examples of suitable potentially anionic groups which can be converted into anions by neutralizing agents are carboxylic, sulfonic or phosphonic acid groups, especially carboxylic acid groups. Examples of suitable anionic groups are carboxylate, sulfonate, or phosphonate groups, especially carboxylate groups. Examples of suitable neutralizing agents for the potentially anionic groups are ammonia, ammonium salts, such as ammonium carbonate or ammonium hydrogen carbonate, for example, and also amines, such as trimethylamine, triethylamine, tributylamine, dimethylaniline, diethyl aniline, triphenylamine, dimethylethanolamine, diethylethanolamine, methyl diethanolamine, triethanolamine, and the like.

The amount of neutralizing agent is generally chosen such that from 1 to 100 equivalents, preferably from 50 to 90 equivalents, of the potentially cationic or potentially anionic groups of a binder B are neutralized.

Examples of suitable binders B1 for anionically depositable electrocoat materials are known from German patent application DE 28 24 418 A1. They are preferably polyesters, epoxy resin esters, poly(meth)acrylates, maleate oils or polybutadiene oils having a weight-average molecular weight of from 300 to 10,000 Daltons and an acid number of from 35 to 300 mg KOH/g.

Particularly preferred aqueous coating materials (ECM) are cathodically depositable and thus comprise at least one binder B having cationic groups as described before.

Optional Crosslinker CL

The inventive aqueous electrocoating material (ECM) may comprise as component (b) at least one crosslinker CL. With preference, at least one externally crosslinking binder B is used in combination with at least one crosslinker CL. With particular preference, at least one externally crosslinking binder B containing potentially cationic or cationic groups is used in combination with at least one crosslinker CL.

Suitable crosslinkers CL include all customary and known crosslinking agents which contain suitable complementary reactive functional groups. The crosslinkers CL are preferably selected from the group consisting of blocked polyisocyanates, melamine-formaldehyde resins, tris(alkoxycarbonylamino)triazines, and polyepoxides. The crosslinkers CL are more preferably selected from the group consisting of blocked polyisocyanates and highly reactive melamine-formaldehyde resins. Blocked polyisocyanates are used with particular preference.

Blocked polyisocyanates CA can be prepared from customary and known polyisocyanates containing aliphatically, cycloaliphatically, araliphatically and/or aromatically attached isocyanate groups. Preference is given to using polyisocyanates having from 2 to 5 isocyanate groups per molecule and having viscosities of from 100 to 10,000 mPa*s, preferably from 100 to 5,000 mPa*s, and in particular from 100 to 2,000 mPa*s (at 23° C.). Moreover, the polyisocyanates may be hydrophilically or hydrophobically modified.

Suitable polyisocyanates include aliphatic polyisocyanates, aromatic polyisocyanates or mixtures of aromatic and aliphatic polyisocyanates. It is possible here to use not only monomeric polyisocyanates, dimers or trimers of the polyisocyanates, but also oligomeric or polymeric polyisocyanates. Preferred isocyanates are those whose monomeric constituent contains about 3 to about 36, more particularly about 8 to about carbon atoms. Examples of such suitable monomeric polyisocyanates are diisocyanates such as trimethylene diisocyanate, tetramethylene diisocyanate, pentamethylene diisocyanate, hexamethylene diisocyanate, propylene diisocyanate, ethylethylene diisocyanate, methyltrimethylene diisocyanate, trimethylhexamethylene diisocyanate, xylylene diisocyanate, 1,3-cyclopentylene diisocyanate, 1,4-cyclohexylene diisocyanate, 1,2-cyclohexylene diisocyanate, 4,4'-diphenylmethane diisocyanate, 1,5-naphthylene diisocyanate, toluene 2,4-diisocyanate, isophorone diisocyanate, and 4,4'-diisocyanatodicyclohexylmethane. Polyisocyanates of higher isocyanate functionality can also be used, such as tris(4-isocyanatophenyl) methane, 2,4,4'-triisocyanatodiphenylmethane, or bis(2,5- diisocyanato-4-methylphenyl)-methane. These polyisocyanates may be used in the form of the dimer or trimer or may serve as building blocks for oligomeric or polymeric polyisocyanates. Furthermore, mixtures of polyisocyanates can also be utilized.

Examples of suitable blocking agents for preparing the blocked polyisocyanates CA are phenols, such as phenol, cresol, xylenol, nitrophenol, chlorophenol, ethylphenol, tert-butylphenol, hydroxybenzoic acid, esters of this acid or 2,5-di-tert-butyl-4-hydroxytoluene;

lactams, such as ε-caprolactam, δ-valerolactam, γ-butyrolactam or β-propiolactam;

active methylenic compounds, such as diethyl malonate, dimethyl malonate, methyl, or ethyl acetoacetate or acetylacetone;

alcohols such as methanol, ethanol, n-propanol, isopropanol, n-butanol, isobutanol, tert-butanol, n-amyl alcohol, tert-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, acetocyanohydrin, 1,4-cyclohexyl-dimethanol or propane diol;

mercaptans such as butyl mercaptan, hexyl mercaptan, tert-butyl mercaptan, tert-dodecyl mercaptan, 2-mercaptobenzothiazole, thiophenol, methylthiophenol or ethylthiophenol;

acid amides such as acetoanilide, acetoanisidinamide, acrylamide, methacrylamide, acetamide, stearamide or benzamide;

imides such as succinimide, phthalimide or maleimide;

amines such as diphenylamine, phenylnaphthylamine, xylidine, N-phenylxylidine, carbazole, aniline, naphthylamine, butylamine, dibutylamine or butylphenylamine;

imidazoles such as imidazole or 2-ethylimidazole;

ureas such as urea, thiourea, ethyleneurea, ethylenethiourea or 1,3-diphenylurea;

carbamates such as phenyl N-phenylcarbamate or 2-oxazolidone;

imines such as ethylenimine;

oximes such as acetone oxime, formaldoxime, acetaldoxime, acetoxime, methyl ethyl ketoxime, diisobutyl ketoxime, diacetyl monoxime, benzophenone oxime or chlorohexanone oximes;

salts of sulfurous acid such as sodium bisulfite or potassium bisulfite;

hydroxamic esters such as benzyl methacrylohydroxamate (BMH) or allyl methacrylohydroxamate; or substituted pyrazoles, imidazoles or triazoles; and also 1,2-polyols such as ethylene glycol, propylene glycol, and 1,2-butanediol;

2-hydroxy esters such as 2-hydroxyethyl acrylate, 2-hydroxyethyl methacrylate; and mixtures of these blocking agents BA.

The amount of the above-described crosslinker CL In the electrocoating materials of the invention is guided in particular by their functionality with regard to the crosslinking reaction with the cationic polymer particles being present in the aqueous dispersion (AD) and the binder B described previously and may therefore readily be determined by the skilled worker on the basis of his or her general art knowledge. Preferably, the at least one crosslinker CL is present in a total amount of 15 to 30 wt. %—based on total solid content of the electrocoating material (ECM).

Pigment:

The inventive aqueous electrocoating materials (ECM) further comprise at least one pigment. The pigments are preferably selected from the group consisting of customary and known color pigments, effect pigments, electrically conductive pigments, magnetically shielding pigments, fluorescent pigments, extender pigments, and anticorrosion pigments. The total amount of pigments, based in each case on the total weight of the aqueous electrocoating material (ECM), is preferably in the range from 0.1 to 30 wt. % or in the range from 0.5 to 20 wt. %, more preferably in the range from 1.0 to 15 wt. %, very preferably in the range from 1.5 to 10 wt. %, and more particularly in the range from 2 to 5 wt. %, or in the range from 2 to 4 wt. %, or in the range from 2 to 3.5 wt. %.

Additive:

The inventive electrocoating material (ECM) may further comprise at least one customary additive. The expression "additive" defines the presence of a substance as a molecularly independent unit in the aqueous electrocoating material (ECM) and in particular not as a component incorporated reactively into a binder, resin, or the like. Suitable additives include fillers such as calcium sulfate, barium sulfate, silicates such as talc or kaolin, silicas, oxides such as aluminum hydroxide or magnesium hydroxide, nanoparticles, organic fillers such as textile fibers, cellulose fibers, polyethylene fibers or woodflour; free-radical scavengers; slip additives; polymerization inhibitors; defoamers; emulsifiers, especially nonionic emulsifiers such as alkoxylated alkanols and polyols, phenols and alkylphenols or anionic emulsifiers such as alkali metal salts or ammonium salts of alkanecarboxylic acids, alkanesulfonic acids, and sulfo acids of alkoxylated alkanols and polyols, phenols and alkylphenols; wetting agents such as siloxanes, fluorine compounds, carboxylic monoesters, phosphoric esters, polyacrylic acids and their copolymers, or polyurethanes; adhesion promoters; leveling agents; film-formation auxiliaries such as cellulose derivatives; flame retardants; organic solvents; low molecular mass, oligomeric and high molecular mass reactive diluents which can participate in thermal crosslinkings, especially polyols such as tricyclodecanedimethanol, dendrimeric polyols, hyperbranched polyesters, polyols based on metathesis oligomers or branched alkanes having more than eight carbon atoms in the molecule; anticrater agents; polyvinyl alcohol polymers and mixtures thereof. The total amount of additive, based on the total weight of the aqueous electrocoating material (ECM), is preferably 0.1 to 20 wt. %, more preferably 0.1 to 15 wt. %, very preferably 0.1 to 10 wt. %, especially preferably 0.1 to 5 wt. %, and more particularly 0.1 to 2.5 wt. %.

Catalyst:

The inventive electrocoating material (ECM) may further comprise at least one crosslinking catalyst. Suitable catalysts are organic and inorganic salts and complexes of tin, lead, antimony, bismuth, iron or manganese, preferably inorganic and organic salts, and complexes of bismuth and of tin. Preferred tin catalysts are selected from dibutyltin oxide or dibutyltin dilaurate Preferred inorganic salts of bismuth include bismuth subnitrate.

Preferred organic salts and complexes of bismuth are selected from bismuth subsalicylate, bismuth lactate, bismuth ethylhexanoate and bismuth dimethylolpropionate.

With particular preference, bismuth subsalicylate ($C_7H_5O_4Bi$) or bismuth subnitrate is used as crosslinking catalyst.

Based on their solids, the electrocoating materials of the invention preferably contain a total amount of catalyst, in particular bismuth subsalicylate, of 0.05 to 5 wt. %, more preferably of 0.1 to 4 wt. %, and in particular of 0.2 to 4 wt. %.

Preparation of Aqueous Electrocoating Materials (ECM)

The electrocoating materials of the invention are prepared by mixing and homogenizing the above-described constituents (A), (B) and (D) and optionally (C), (E) and (F), using customary and known mixing techniques and apparatus such as stirred tanks, stirred mills, extruders, kneading apparatus, Ultraturrax, inline dissolvers, static mixers, micromixers, toothed-gear dispersers, pressure relief nozzles and/or microfluidizers. With particular preference, the aqueous dispersion (AD) is mixed with binder B and optionally crosslinker CL before adding the pigment paste and further additives. The pigments and bismuth containing catalysts are preferably incorporated in the form of pigment pastes or pigment preparations into the electrocoating materials (cf. Römpp Lexikon Lacke and Druckfarben, Georg Thieme Verlag, Stuttgart, N.Y., 1998, "Pigment preparations", page 452).

What has been said about the inventive aqueous dispersion (AD) and inventive process to produce the aqueous dispersion (AD) applies mutatis mutandis with respect to further preferred embodiments of the inventive aqueous electrocoating composition.

Inventive Process to Produce an at Least Partially Coated Substrate:

The inventive aqueous electrocoating material (ECM) can be used to coat an electrically conductive substrate, such as a metal substrate, at least partially. The electrically conductive substrate preferably comprises a motor vehicle or part thereof.

Thus, a further subject-matter of the present invention is a process for producing an at least partially coated substrate by contacting the substrate with the inventive aqueous electrocoating material, forming a film from said material and curing the formed film. The process can further include rinsing the formed film and applying at least one further coating layer onto the cured electrocoating material.

Step (a)

In step (a) of the inventive method, the substrate is a least partially contacted with the inventive aqueous electrocoating material (ECM). "Contacting" in the sense of the present invention refers to the application of the aqueous electrocoating material to the substrate. The application of the electrocoating material (ECM) to the substrate, or the production of a coating film on the substrate, are understood as follows: the electrocoating material (ECM) is applied in such a way that the coating film produced therefrom is arranged on the substrate but need not necessarily be in direct contact with the substrate. Thus, other layers can be present between the coating film and the substrate. For example, a conversion coating, such as a zinc phosphate coating, may be arranged between the substrate and the cured electrocoating layer. This application can be achieved, for example, by immersing the substrate in the aqueous electrocoating material or by spraying or roll application of said material onto the substrate. With preference, application is achieved by immersing the substrate in said material.

With preference, the coating of the substrate in step (a) is done by electrophoretic, preferably cataphoretic, deposition of this coating material onto substrate surface. This is accomplished by introducing the substrate at least partly, preferably completely, preferably into a dip-coating bath containing the inventive electrocoating material (ECM) and applying an electrical voltage between the substrate and at least one counterelectrode. The counterelectrode may in this case be located in the dip-coating bath. Alternatively, or additionally, the counterelectrode may also be present separately from the dip-coating bath, for example via an anion exchange membrane which is permeable to anions. In this case, anions formed during dip coating are transported from the coating material through the membrane into the anolyte, allowing the pH in the dip-coating bath to be regulated or kept constant. The counterelectrode is preferably separate from the dip-coating bath. The passage of electrical current between anode and cathode is accompanied by deposition of a firmly adhering paint film on the cathode, i.e., on the substrate.

Step (a) of the method of the invention is carried out preferably at a temperature in a range from 25 to 35° C. and a voltage of 120 to 350 V, preferably of 140 to 300 V. The voltage may be kept constant during the stated duration. Alternatively, however, the voltage may also adopt different values during the deposition duration within the minimum and maximum previously listed—for example, it may swing back and forth or rise in ramp or step form from the minimum to the maximum deposition voltage. In step (a) of the method of the invention, preferably, there is full coating of the substrate with the aqueous electrocoating material (ECM) of the invention, by complete electrophoretic, preferably cataphoretic, deposition on the entire substrate surface.

In step (a) of the method of the invention, the aqueous electrocoating material (ECM) of the invention is preferably applied such that the resulting cured electrocoat film has a dry film thickness in the range from 5 to 70 μm, more preferably from 10 to 60 μm, especially preferably from 20 to 50 μm.

Optional Step (b):

In step (b), the coating film formed in step (a) may be rinsed with an aqueous solution. In one example, the aqueous solution primarily contains water but also may contain further additives in small amounts. In another example, the aqueous solution consists of ultrafiltrate obtained from the aqueous electrocoating material (ECM). The implementation of optional step (b) allows to recycle excess aqueous electrocoating material (ECM), present after step (a) on the at least partly coated substrate, into the dip-coating bath.

Step (c)

In step (c) of the inventive method, the coating film obtained from at least partially applying the inventive aqueous electrocoating material (ECM) on the substrate after step (a) or (b) is cured.

Curing of the electrocoating film is understood to mean the conversion of such a film to the ready-to-use state, i.e. to a state in which the substrate provided with the respective coating film can be transported, stored and used as intended. More particularly, a cured coating film is no longer soft or tacky, but has been conditioned as a solid coating film which does not undergo any further significant change in its properties, such as hardness or adhesion on the substrate, even under further exposure to curing conditions.

Step (c) of the method of the invention is carried out preferably by means of baking after step (a) or (b), preferably in an oven. The curing here takes place preferably at a substrate temperature in the range from 100 to 250° C., more preferably 130 to 190° C. Step (c) takes place preferably over a duration of 10 to 30 minutes, more preferably 15 minutes.

Optional Step (d):

After curing the coating layer in step (c), at least one further coating layer may be applied on the cured coating layer. The resulting electrocoat can then be overcoated with a surfacer or with an anti-stonechip primer and a solid-color topcoat material or, alternatively, with a basecoat material and a clearcoat material by the wet-on-wet technique. The surfacer film or anti-stonechip primer film and also the solid-color topcoat film are preferably each baked individually. The basecoat film and the clearcoat film are preferably baked together. This procedure results in multicoat paint systems having outstanding performance properties.

What has been said about the inventive aqueous dispersion (A), the inventive process to produce the aqueous dispersion (AD) and the inventive aqueous electrocoating composition (ECM) applies mutatis mutandis with respect to further preferred embodiments of the inventive process to produce an at least partially coated substrate.

Inventive Coated Substrate:

A further subject of the present invention is an at least partly coated electrically conductive substrate which is obtainable by means of the method of the invention.

What has been said about the inventive aqueous dispersion (AD), the inventive process to produce the aqueous dispersion (AD), the inventive aqueous electrocoating composition (ECM) and the inventive process to produce an at least partially coated substrate applies mutatis mutandis with respect to further preferred embodiments of the inventive coated substrates.

The invention is described in particular by the following numbered clauses:

1. Aqueous dispersion comprising cationic polymer particles (AD), said aqueous dispersion (AD) being obtained by:
    a) preparing an aqueous dispersion of intermediate (I1) by reacting a compound (C1) containing at least one free isocyanate group and at least two epoxide groups with
       (i) an aqueous solution of polyvinyl alcohol polymer (C2a-i) or
       (ii) a dispersion of polyvinyl alcohol polymer in an organic solvent S1 (C2a-ii) and subsequent dispersion of intermediate (I1) in water;
    b) reacting the aqueous dispersion of intermediate (I1) obtained in step (a) with a compound (C3) comprising at least one epoxide group and at least two blocked primary amino groups;
    c) optionally diluting the aqueous dispersion with an aqueous solution; and
    d) optionally at least partially removing organic solvents present in the dispersion obtained in step (c), wherein at least one acid is present in step a) and/or step b) and/or step c).

2. Aqueous dispersion according to clause 1, wherein compound (C1) contains exactly one free isocyanate group and exactly two epoxide groups.

3. Aqueous dispersion according to clause 1 or 2, wherein compound (C1) has an epoxy equivalent weight (EEW) of 300 to 700 g/Eq., preferably 350 to 650 g/Eq., more preferably 400 to 600 g/Eq., even more preferably 450 to 550 g/Eq., very preferably 500 to 530 g/Eq., as determined according to DIN EN ISO 3001:1999-11.

4. Aqueous dispersion according to any of the preceding clauses, wherein compound (C1) is obtained by reacting at least one compound (C1-1) containing at least two epoxide groups, in particular at least three epoxide groups, with at least one compound (C1-2) containing at least one amine group and the resulting product is further reacted with at least one compound (C1-3) containing at least two free isocyanate groups.

5. Aqueous dispersion according to clause 4, wherein compound (C1-1) is a reaction product of propoxylated pentaerythritol and epichlorohydrin.

6. Aqueous dispersion according to clause 4 or 5, wherein compound (C1-2) is selected from secondary amines, preferably from $C_1$-$C_{10}$ dialkyl amines, more preferably from $C_2$-$C_6$ dialkyl amines, very preferably from $C_3$ dialkyl amines.

7. Aqueous dispersion according to any of clauses 4 to 6, wherein compound (C1-3) is selected from cycloaliphatic, aliphatic-cycloaliphatic, aromatic, aliphatic-aromatic and/or cycloaliphatic-aromatic diisocyanates, dimers and trimers of the stated diisocyanates and mixtures thereof, preferably aliphatic diisocyanates, such as hexamethylene diisocyanate, isophorone diisocyanate (IPDI), dicyclohexylmethane 4,4'-diisocyanate, 2,4- or 2,6-diisocyanato-1-methylcyclohexane, and m-tetramethylxylylene diisocyanate (m-TMXDI), very preferably isophorone diisocyanate.

8. Aqueous dispersion according to any of clauses 4 to 7, wherein compounds (C1-1), (C1-2) and (C1-3) are reacted in a molar ratio of 1:5:5 to 1:1:1, preferably 1:3:3 to 1:1:1, very preferably 1:1:1.

9. Aqueous dispersion according to any of the preceding clauses, wherein the polyvinyl alcohol polymer is a copolymer of vinyl alcohol and at least one ethylenically unsaturated monomer, preferably selected from vinyl acetate, vinyl acetal, ethylene and/or propylene.

10. Aqueous dispersion according to any of the preceding clauses, wherein the polyvinyl alcohol polymer has a fraction of vinyl alcohol of 50 to 99.9 mol %, preferably from 60 to 99.9 mol %, more preferably from 70 to 99 mol %, very preferably from 80 to 99 mol %.

11. Aqueous dispersion according to any of the preceding clauses, wherein the polyvinyl alcohol polymer has a viscosity at 20° C. of at least 2 mPa*s, preferably of 2 to 60 mPa*s, more preferably 10 to 60 mPa*s, even more preferably 30 to 50 mPa*s, very preferably 45 to 49 mPa*s, as determined at a concentration of 4 wt. % in water according to DIN 53015:2018-07.

12. Aqueous dispersion according to any of the preceding clauses, wherein the polyvinyl alcohol polymer has a degree of hydrolysis of 70 to 100 mol %, preferably 70 to 95 mol %, very preferably 86 to 89 mol %.

13. Aqueous dispersion according to any of the preceding clauses, wherein the aqueous solution (C2a-i) contains 5 to 15 wt. % polyvinyl alcohol polymer, preferably 5 to 10 wt. % polyvinyl alcohol polymer, and 85 to 95 wt. %, preferably 90 to 95 wt. % of water, based in each case on the total weight of the aqueous solution (C2a-i).

14. Aqueous dispersion according to any of the preceding clauses, wherein compound (C1) is reacted with compound (C2a-i) in a ratio of 1:10 to 10:1, preferably 1:10 to 2:1, very preferably 1:10 to 1:1, each ratio being based on the solid content of compounds (C1) and (C2a-i).

15. Aqueous dispersion according to any of clauses 1 to 12, wherein the dispersion (C2a-ii) contains 50 to 60 wt. % polyvinyl alcohol polymer and 40 to 50 wt. % of at least one organic solvent S1, based in each case on the total weight of the dispersion (C2a-ii).

16. Aqueous dispersion according to clause 15, wherein the organic solvent S1 is selected from aliphatic and/or aromatic hydrocarbons, ketones, esters, amides, methylal, butylal, 1,3-dioxolane, glycerol formal, hydrocarbons and mixtures thereof, preferably ketones, very preferably methyl isobutyl ketone.

17. Aqueous dispersion according to any of clauses 1 to 12 and 15 to 16, wherein compound (C1) is reacted with compound (C2a-ii) in a weight ratio of 1:20 to 1:10, preferably 1:17 to 1:15.

18. Aqueous dispersion according to any of the preceding clauses, wherein compound (C3) is obtained by reacting at least one compound (C3-1) containing at least one epoxide group with at least one compound (C3-2) containing at least one aromatic group and at least two hydroxyl groups in the presence of at least one solvent S2 and the resulting product is further reacted with at least one polyamine (C3-3) containing at least two blocked primary and at least one free secondary amino group.

19. Aqueous dispersion according to clause 18, wherein compound (C3-1) is reacted with compound (C3-2) in the presence of at least one catalyst, in particular triphenyl phosphine.

20. Aqueous dispersion according to clause 18 or 19, wherein the product obtained by reacting compounds (C3-1) and (C3-2) has an epoxy equivalent weight (EEW) of 800 to 2,000 g/Eq., preferably 900 to 1,500 g/Eq., very preferably 980 to 1,100 g/Eq., as determined according to DIN EN ISO 3001:1999-11.

21. Aqueous dispersion according to any of clauses 19 to 20, wherein compounds (C3-1), (C3-2) and (C3-3) are reacted in a molar ratio of 10:6:1 to 7:4:1.

22. Aqueous dispersion according to any of clauses 18 to 21, wherein compound (C3-1) has an epoxy equivalent weight (EEW) of 100 to 300 g/Eq., preferably 150 to 250 g/Eq., very preferably 170 to 200 g/Eq., as determined according to DIN EN ISO 3001:1999-11.

23. Aqueous dispersion according to any of clauses 18 to 22, wherein compound (C3-1) has a viscosity at 20° C. of 30,000 to 50,000 mPa*s, preferably 35,000 to 37,000 m Pa*s, as determined according to DIN EN ISO12058-1:2018-11.

24. Aqueous dispersion according to any of clauses 18 to 23, wherein compound (C3-2) is selected from compounds in which at least one hydroxyl group, preferably both hydroxyl groups, are directly attached to at least one aromatic moiety.

25. Aqueous dispersion according to any of clauses 18 to 24, wherein compound (C3-2) is selected from bisphenol A.

26. Aqueous dispersion according to any of clauses 18 to 25, wherein the at least one solvent S2 is selected from aliphatic and/or aromatic hydrocarbons, ketones, esters, alcohols, amides, methylal, butylal, 1,3-dioxolane, glycerol formal and mixtures thereof, preferably alcohols, very preferably phenoxy propanol and/or isobutanol.

27. Aqueous dispersion according to any of clauses 18 to 26, wherein the polyamine (C3-3) has an amine equivalent of 120 to 130 g/Eq.

28. Aqueous dispersion according to any of clauses 18 to 27, wherein the polyamine (C3-3) is obtained by reacting a polyamine (A) with at least one blocking agent (BA).

29. Aqueous dispersion according to clause 28, wherein the polyamine (A) is selected from diethylenetriamine, 3-(2-aminoethyl)aminopropylamine, dipropylenetriamine, N1-(2-(4-(2-aminoethyl)piperazin-1-yl)ethyl) ethane-1,2-diamine, triethylene tetramine, N, N'-bis(3-aminopropyl)ethylenediamine and mixtures thereof, preferably from diethylene triamine.

30. Aqueous dispersion according to clause 28 or 29, wherein the at least one blocking agent (BA) is selected from acetone, methyl ethyl ketone, methyl isobutyl ketone, diisopropyl ketone, cyclopentanone, cyclohexanone or mixtures thereof, preferably methyl ethyl ketone and/or methyl isobutyl ketone.

31. Aqueous dispersion according to any of the preceding clauses, wherein the at least one acid is selected from organic acids, preferably from carboxylic acids, very preferably from acetic acid.

32. Aqueous dispersion according to any of the preceding clauses, wherein the polymer particles have an average particle size (z-mean) of 100 to 1,000 nm, preferably of 100 to 700 nm, more preferably of 100 to 600 nm, very preferably of 100 to 400 nm, as determined according to DIN EN ISO 22412:2018-09.

33. Aqueous dispersion according to any of the preceding clauses, wherein the aqueous dispersion (AD) contains the cationic polymer particles in a total amount of 15 to 40 wt. %, preferably 20 to 30 wt. %, based in each on the total weight of the aqueous dispersion (AD).

34. Aqueous dispersion according to any of the preceding clauses, wherein the aqueous dispersion (AD) contains water in a total amount of 60 to 85 wt. %, preferably 70 to 80 wt. %, based in each on the total weight of the aqueous dispersion (AD).

35. Aqueous dispersion according to any of the preceding clauses, wherein the total fraction of cationic polymer particles and water in the aqueous dispersion (AD) is at least 90 wt. %, preferably at least 95 wt. %, very preferably at least 98 wt. %, based in each on the total weight of the aqueous dispersion.

36. Process for preparing an aqueous dispersion (AD) comprising cationic polymer particles, said process comprising the following steps:
(1) preparing an aqueous dispersion of intermediate (I1) by reacting a compound (C1) containing at least one free isocyanate group and at least two epoxide groups with
(i) an aqueous solution of polyvinyl alcohol polymer (C2a-i) or
(ii) a dispersion of polyvinyl alcohol polymer in an organic solvent (C2a-ii) and subsequent dispersion of intermediate (i1) in water;
(2) reacting the aqueous dispersion of intermediate (I1) obtained in step (1) with a compound (C3) comprising at least one epoxide group and at least two blocked primary amino groups;
(3) optionally diluting the aqueous dispersion with an aqueous solution; and
(4) optionally at least partially removing organic solvents present in the dispersion obtained after step (3),
wherein at least one acid is present in step (1) and/or step (2) and/or step (3).

37. Aqueous electrocoating material (ECM) comprising
(A) at least one aqueous dispersion (AD) according to any of clauses 1 to 35 or at least one aqueous dispersion (AD) prepared according to a process as claimed in clause 36,
(B) at least one further binder B being different from the cationic polymer particles contained in the aqueous dispersion (AD),
(C) optionally at least one crosslinker (CL),
(D) at least one pigment,
(E) optionally at least one additive, and
(F) optionally at least one catalyst.

38. Aqueous electrocoating material according to clause 37, wherein the at least one aqueous dispersion (AD) is present in a total amount of 0.5 to 20 wt. %, preferably of 1 to 15 wt. %, more preferably of 1.5 to 10% by weight, very preferably of 2 to 4 wt. %, based in each case on the total weight of the aqueous electrocoating material (ECM).

39. Process for producing an at least partially coated substrate, said process comprising the following steps:
(a) at least partially contacting a substrate with an aqueous electrocoating material (ECM) according to clause 37 or 38;
(b) optionally rinsing the coating film formed in step (b) with an aqueous solution:
(c) curing the coating film formed after step (a) or optionally after step (b); and
(d) optionally applying at least one further coating layer and curing said coating layer.

40. At least partially coated substrate obtained by the process as claimed in clause 39.

Examples

The present invention will now be explained in greater detail through the use of working examples, but the present invention is in no way limited to these working examples. Moreover, the terms "parts", "%" and "ratio" in the examples denote "parts by mass", "mass %" and "mass ratio" respectively unless otherwise indicated.

1. METHODS OF DETERMINATION 1.1 Solids Content (Solids, Nonvolatile Fraction)
Unless stated otherwise, the solids content (also called proportion of solids, solid-state 5 content, proportion of nonvolatiles) was determined to DIN EN ISO 3251: 2019-09 at 130 or 180° C. for 30 min with a sample starting weight of 1.0 g.

1.2 Epoxy Equivalent Weight
The epoxy equivalent weight was determined according to DIN EN ISO 3001:2019-08.

1.3 Determination of Viscosity
The viscosity of compound C3 was determined at 23° C. using a shear rate of 5,000 $s^{-1}$ or 10,000 $s^{-1}$ according to DIN EN ISO 3219:1994-10 and DIN 53019-2:2001-02 with a Brookfield CAP2000+ viscosimeter; cone plate configuration; Cone CAP 03.

1.4. Amine Equivalent Mass
The amine equivalent mass (solution) was ascertained as follows: the sample for analysis was dissolved at room temperature in glacial acetic acid and titrated against 0.1N perchloric acid in glacial acetic acid in the presence of crystal violet. The initial mass of the sample and the consumption of perchloric acid gave the amine equivalent mass (solution), the mass of the solution of the basic amine that is needed to neutralize one mole of perchloric acid.

1.5. Degree of Blocking of the Primary Amino Groups

The degree of blocking of the primary amino groups was determined by means of IR spectrometry using a Nexus FT IR spectrometer (from Nicolet) with the aid of an IR cell (d=25 m, KBr window) at the absorption maximum at 3310 cm$^{-1}$ on the basis of concentration series of the amines used and standardization to the absorption maximum at 1166 cm$^{-1}$ (internal standard) at 25° C.

1.6 Average Particle Size (z-Mean)

The average particle size (z-mean) of the cationic particles contained in the aqueous dispersion (AD) was determined according to DIN EN ISO 22412:2018-09.

1.7 Salt spray test (SST)

The corrosion resistance of coatings is determined by a salt spray test. The salt spray testing is carried out according to DIN EN ISO 9227 NSS (date: September 2012) for the coated substrate under study. The samples under study are accommodated in a chamber in which at a temperature of 35° C.—continuously over duration of 504 hours or 1008 hours—a mist is produced from a 5% strength sodium chloride solution with a controlled pH in the range from 6.5 to 7.2. The mist deposits on the samples under study and covers them with a corrosive saltwater film.

If prior to the salt spray testing according to DIN EN ISO 9227 NSS, the coating on the samples under study is scored down to the substrate with a blade incision, the samples can be investigated for their level of corrosive undermining to DIN EN ISO 4628-8 (03-2013), since the substrate corrodes along the score line during the DIN EN ISO 9227 NSS salt spray testing. As a result of the progressive process of corrosion, the coating is undermined to a greater or lesser extent during the test. The extent of undermining in [mm] is a measure of the resistance of the coating to corrosion.

Each rating result shown further below is the average of 3 individual test results. Each individual test result was generated by means of an individual panel (i.e. coated test substrate). In case the individual panel exhibits seven individual holes, the individual test result of one individual panel on edges of holes protection thus itself is an average of analysis of the seven individual holes.

1.8 VDA Climate Change Test

The VDA climate change test is used to determine the corrosion resistance of a coating on a substrate and is either performed according to DIN EN ISO 11997-1:2018-01 (denoted VDA1 hereinafter) in 5 or 10 so-called cycles or according to VDA 233-102 (June 2013) in 12 so-called cycles (denoted VDA2 hereinafter).

If the coating to be tested is present on a metallic substrate having holes, these holes simulate a real-life metallic substrate having a comparably high number of edges/edge zones. Also, in case of substrates having holes whose edges are not post processed, like, for example, sanded or polished before any pretreatment and coating processes start, these substrates are even more challenging in terms of coating and thus corrosion edge protection. The degree of corrosion on the edges of these holes (also called "edges of holes corrosion" or "edge corrosion") may be assessed visually by observing the degree/portion of the hole edge being corroded after the climate change test (rating scale from 0 to 5, wherein "5" means 100% corrosion (the whole edge of the hole is corroded) and "0" means 0% corrosion).

If the coating of the samples to be tested is scored down to the substrate with a knife cut before the climate change test is performed, the samples can be tested for their degree of under-film corrosion in accordance with DIN EN ISO 4628-8 (03-2013), since the substrate corrodes along the scoring line during the climate change test. As corrosion progresses, the coating is more or less infiltrated during the test. The degree of undermining in [mm] is a measure of the corrosion resistance of the coating (so called scribe corrosion).

Each rating result shown further below is the average of 3 individual test results. Each individual test result was generated by means of an individual panel (i.e. coated test substrate). In case the individual panel exhibits seven individual holes, the individual test result of one individual panel on edges of holes protection thus itself is an average of analysis of the seven individual holes.

1.9 Surface Roughness

The surface roughness is determined according to DIN EN 10049:2014-03.

1.10 Film Build

The film build is determined according to DIN EN ISO 2178:2016-11.

2. PREPARATION OF AQUEOUS DISPERSIONS (AD) OF CATIONIC POLYMER PARTICLES

2.1 Preparation of Inventive Aqueous Dispersions of Cationic Polymer Particles Using a Solution of Polyvinyl Alcohol Polymer (AD1) to (AD6)

2.1.1 Preparation of Compound (C1)

33.6 parts of a liquid epoxy resin (epoxy equivalent weight (EEW)=220 to 230 g/Eq.) was added to a reactor and the contents of the reactor were heated to 50° C. Afterwards, 5.1 parts of a dialkyl amine were added under stirring and stirring was continued at 50° C. for a further hour until the epoxy equivalent weight (EEW) of the obtained reaction product (RP1) in greater than 380 g/Eq.

In a separate reactor, 50 parts methyl isobutyl ketone and 11.2 parts isophorone diisocyanate were mixed and the mixture was heated to 70° C. under stirring. Afterwards, the reaction product RP1 was added over the course of 1.5 hours under stirring and stirring was continued at 70° C. for 1 hour to obtain compound (C1) having an epoxy equivalent weight (EEW) in the range of 495 to 520 g/Eq. and a solid content of 49 to 50 wt. %.

2.1.2 Preparation of different aqueous solutions of polyvinyl alcohol polymer (C2a-i)

Different aqueous solutions were prepared according to the following general procedure (see Table 1 for amounts of polyvinyl alcohol polymer and water): The respective amount of polyvinyl alcohol polymer (PVA) (commercially available from Kuraray Co. LTD under the brand name "Mowiol") was slowly added to a first portion of water under vigorous stirring. Afterwards, the solution was heated to 80° C. and a second portion of water was added. The obtained aqueous solution of polyvinyl alcohol polymer was cooled to 20° C.

TABLE 1

Preparation of different aqueous solutions (C2a-i) (amounts are given in wt. %, based on the total weight of the aqueous solution)

|  | Aqueous solution (C2a-i) | |
| --- | --- | --- |
|  | PVA-1 | PVA-2 |
| Polyvinyl alcohol polymer | 5 | 10 |
| 1$^{st}$ portion of water | 69.1 | 66.6 |
| 2$^{nd}$ portion of water | 25.9 | 23.4 |
| Solids content [wt. %] | 5 | 10 |

2.1.3 Preparation of Different Aqueous Dispersions of Intermediate (I1)

Different aqueous dispersions of intermediate (I1) were prepared according to the following general procedure (see Table 2 for amounts): The respective amount of compound (C1) prepared according to point 2.1.1 was dispersed over the course of 10 minutes in the respective amount of the aqueous polyvinyl alcohol polymer solution prepared according to point 2.1.2 at 20° C. under stirring. Stirring was continued at 20° C. for 30 minutes before the respective amount of acetic acid was added over the course of 5 minutes at 20° C. After the end of the addition, stirring was continued for another 2 h to obtain the respective intermediate (I1).

TABLE 2

Preparation of different aqueous dispersions of intermediate (I1) (amounts are given in wt. %, based on the total weight of the aqueous dispersion)

| | Aqueous dispersion of intermediate (I1) | | | | | |
|---|---|---|---|---|---|---|
| | I1-1 | I1-2 | I1-3 | I1-4 | I1-5 | I1-6 |
| C1 | 16.5 | 0.990 | 1.96 | 3.84 | 9.05 | 16.5 |
| PVA-1 | — | 99.0 | 97.8 | 96.0 | 90.5 | 82.7 |
| PVA-2 | 82.7 | — | — | — | — | — |
| Acetic acid | 0.771 | 0.0230 | 0.0910 | 0.179 | 0.422 | 0.771 |
| Solid content [wt. %][1] | 17.3 | 5.47 | 5.97 | 6.90 | 9.47 | 13.2 |
| Ratio C1:PVA[2] | 1:1 | 1:10 | 1:5 | 1:2.5 | 1:1 | 2:1 |

[1]calculated

[2]ratio used to prepare respective (I1), ratio is based on the solids content of PVA-1 and C1

2.1.4 Preparation of Polyamine (C3-3)

The polyamine (C3-3) was prepared by azeotropic removal of water from the reaction of diethylenetriamine (from BASF SE) with methyl isobutyl ketone in methyl isobutyl ketone at 110 to 140° C. Adjustment to an amine equivalent mass (solution) of 124 g/Eq. was carried out by dilution with methyl isobutyl ketone. Blocking of the primary amino groups of 98.5% was determined by means of IR spectroscopy, based on the residual absorption at 3310 $cm^{-1}$.

2.1.5 Preparation of Compound (C3)

13.3 parts of a liquid epoxy resin (EEW=184 to 189 g/Eq.), 6.1 parts of bisphenol A and 2.2 parts of phenoxy propanol were mixed in a reactor and heated to 150° C. before 0.036 parts of triphenyl phosphine were added. The contents of the reactor were cooled to 130° C. and stirring was continued until the EEW of the obtained reaction product is greater than 1,000 g/Eq. (if necessary, further triphenyl phosphine was added to obtain the EEW). Afterwards, the mixture was diluted with 9.4 parts of isobutanol and cooled to 105° C. before 2.2 parts of polyamine (C3-3) prepared according to point 2.1.4 were added over the course of 30 minutes. The resulting compound (C3) had a viscosity (35% solution in methoxy-2,1-propanol) of 503 mPa*s.

2.1.6 Preparation of Different Aqueous Dispersions (AD1) to (AD6)

Different aqueous dispersions (AD1) to (AD4) were prepared according to the following general procedure (see Table 3 for amounts): The respective amounts of aqueous dispersion of intermediate (I1-1) to (11-6) and acetic acid were added to 33.2 wt. % of compound C3 prepared according to point 2.1.5 under stirring. Finally, the mixture was diluted with the respective amount of water to obtain the respective aqueous dispersion (AD).

TABLE 3

Preparation of different aqueous dispersions (AD1) to (AD6) (amounts are given in wt. %, based on the total weight of the aqueous dispersion)

| | Aqueous dispersion (AD) | | | | | |
|---|---|---|---|---|---|---|
| | AD1 | AD2 | AD3 | AD4 | AD5 | AD6 |
| C3 | 33.2 | 33.2 | 33.2 | 33.2 | 33.2 | 33.2 |
| I1-1 | 22.2 | — | — | — | — | — |
| I1-2 | — | 22.0 | — | — | — | — |
| I1-3 | — | — | 22.0 | — | — | — |
| I1-4 | — | — | — | 22.0 | — | — |
| I1-5 | — | — | — | — | 22.0 | — |
| I1-6 | — | — | — | — | — | 22.0 |
| Acetic acid | 0.210 | 0.379 | 0.379 | 0.379 | 0.379 | 0.379 |
| water | 44.4 | 44.4 | 44.4 | 44.4 | 44.4 | 44.4 |
| Solids content [wt. %][1] | 25.7 | 23.5 | 23.5 | 23.4 | 24.4 | 26.3 |
| particle size [nm][2] | n.d.[3] | n.d.[3] | 262/249 | 234 | 280[4] | 130 |

[1]determined according to point 1.1 at 130° C. for 30 minutes

[2]determined according to point 1.6

[3]not determinable

[4]bimodal

2.2 Preparation of Inventive Aqueous Dispersions of Cationic Polymer Particles Using a Dispersion of Polyvinyl Alcohol Polymer in an Organic Solvent (AD7)

2.2.1 Preparation of dispersion of polyvinyl alcohol polymer in organic solvent (C2b-ii)

An 60 wt. % dispersion of polyvinyl alcohol polymer in methyl isobutyl ketone was prepared by dispersing 300 grams of a polyvinyl alcohol polymer (commercially available from Kuraray Co. LTD under the brand name "Mowiol") in 200 grams of methyl isobutyl ketone under vigorous stirring at 80° C.

2.2.2 Preparation of Aqueous Dispersion of Intermediate (I1)

30 grams of compound (C1) prepared according point 2.1.1 were added over the course of 30 minutes to 500 grams of the dispersion prepared in point 2.2.1 at 80° C. under stirring. Stirring was continued at 80° C. for 3 hours before the methyl isobutyl ketone was removed by evaporation. 125 grams of the obtained product were dispersed at 20° C. in 2375 grams of water under vigorous stirring and the temperature was raised to 80° C. Stirring was continued for another 3 hours at 80° C. to obtain the aqueous dispersion of intermediate (I1).

2.2.3 Preparation of Compound (C3)

13.3 parts of a liquid epoxy resin (EEW=184 to 189 g/Eq.), 6.1 parts of bisphenol A and 2.2 parts of phenoxy propanol were mixed in a reactor and heated to 150° C. before 0.036 parts of triphenyl phosphine were added. The contents of the reactor were cooled to 130° C. and stirring was continued until the EEW of the obtained reaction product is greater than 1,000 g/Eq. (if necessary, further triphenyl phosphine was added to obtain the EEW). Afterwards, the mixture was diluted with 9.4 parts of isobutanol and cooled to 105° C. before 2.2 parts of polyamine (C3-3) prepared according to point 2.1.4 were added over the course of 30 minutes. The resulting compound (C3) had a viscosity (35% solution in methoxy-2,1-propanol) of 473 mPa*s.

2.2.4 Preparation of Aqueous Dispersion (AD7)

A mixture of 22.0 parts of the aqueous dispersion of intermediate (I1) prepared according to point 2.2.2 and 0.379 parts of acetic acid was added to 33.2 parts of stirring, the respective aqueous dispersion (AD) is added. Afterwards, the pigment paste and optionally the aqueous solution PVA-1 are introduced with stirring. In all cases, a stable aqueous electrocoating composition was obtained.

TABLE 4

Compositions of aqueous electrocoating materials ECM-1 to ECM-8 (all amounts are given in wt. %, based on the total weight of the electrocoating material (ECM))

|  |  | ECM-1 | ECM-2* | ECM-3 | ECM-4* | ECM-5* | ECM-6* | ECM-7* | ECM-8* |
|---|---|---|---|---|---|---|---|---|---|
| Ingredients | Binder dispersion (BD)[1] | 2,200 | 2,200 | 2,090 | 2,090 | 2,090 | 2,090 | 2,090 | 2,090 |
|  | Pigment paste[2] | 550.0 | 550.0 | 550.0 | 550.0 | 550.0 | 550.0 | 550.0 | 550.0 |
|  | Aqueous dispersion (AD-C) | 137.0 | — | 198.3 | — | — | — | — | — |
|  | Aqueous dispersion (AD1) | — | — | — | 156.7 | — | — | — | — |
|  | Aqueous dispersion (AD2) | — | 170.0 | — | — | — | — | — | — |
|  | Aqueous dispersion (AD3) | — | — | — | — | 171.3 | — | — | — |
|  | Aqueous dispersion (AD4) | — | — | — | — | — | 172.1 | — | — |
|  | Aqueous dispersion (AD5) | — | — | — | — | — | — | 165.0 | — |
|  | Aqueous dispersion (AD6) | — | — | — | — | — | — | — | 153.1 |
|  | PVA-1[3] | 8.100 | — | 106.2 | 9.000 | 34.20 | — | — | — |
|  | Deionized water | 2,605 | 2,580 | 2,384.5 | 2,523.3 | 2,483.6 | 2,404.7 | 2,695.0 | 2,706.9 |
| Bath parameters | Amount of PVA [ppm][4] | 953 | 900 | 1,800 | 1,801 | 1,800 | 1,805 | 2,664 | 3,924 |
|  | Sieve residue [mg] | 3.38 | 2.83 | 30.5 | 15.4 | 3.94 | 4.6 | 5.6 | 2.58 |
|  | pH value (20° C.) | 5.24 | 5.29 | 5.06 | 5.10 | 5.07 | 5.08 | 5.10 | 5.03 |
|  | Conductivity (20° C.) [μS/cm] | 1,539 | 1,581 | 1,437 | 1,492 | 1,510 | 1,520 | 1,490 | 1,500 |
|  | Solid content [%][5] | 18.8 | 19.2 | 18.7 | 18.9 | 18.9 | 18.6 | 18.5 | 18.3 |

*inventive

[1] aqueous dispersion of a cationic binder and a crosslinking agent (commercially available product CathoGuard ® 570 from BASF with a solids content of 36.6 wt. % and a content of PVA1 of 4.4 wt. % (based on total weight),

[2] aqueous pigment paste (commercially available product CathoGuard ® 570 from BASF with a solids content of 62.0 wt. %),

[3] prepared according to point 2.1.2 above

[4] calculated

[5] determined according to point 1.1 at 180° C.

compound C3 prepared according to point 2.2.3 under stirring. Finally, the mixture was dispersed with 44.4 parts of water to obtain the aqueous dispersion having a solids content of 22.9% and an average particle size (z-mean) of 321 nm.

2.3 Preparation of Comparative Aqueous Dispersion of Cationic Polymer Particles (AD-C)

13.3 parts of a liquid epoxy resin (EEW=184 to 189 g/Eq.), 6.1 parts bisphenol A and 2.2 parts of phenoxy propanol were mixed in a reactor and heated to 150° C. before 0.036 parts of triphenyl phosphine were added. The contents of the reactor were cooled to 130° C. and stirring was continued until the EEW of the obtained reaction product is greater than 1000 g/Eq. Afterwards, the mixture was diluted with 3.7 parts of isobutanol and cooled to 105° C. before 2.2 parts of polyamine (C3-3) prepared as described in point 2.1.4 were added over the course of 30 minutes. The resulting mixture was diluted with 5.4 parts of isobutanol and 22 parts of water. Afterwards, 0.38 parts of acetic acid were added and the mixture was dispersed in 44.4 parts of water and 0.34 parts of isobutanol to obtain the aqueous dispersion having a solids content of around 22 wt. % and an average particle size (z-mean) of around 100 nm.

3. PREPARATION OF AQUEOUS ELECTROCOATING COMPOSITIONS

For testing as cathodically depositable electrocoat materials, the aqueous binder dispersion (BD), the pigment paste, the respective aqueous dispersion (AD) described above and optionally an aqueous solution of polyvinyl alcohol polymer PVA-1 prepared according to point 2.1.2 above are combined in accordance with Table 4 below. The procedure here is to introduce the binder dispersion (BD) as an initial charge and to dilute it with deionized water. Subsequently, with

4. PREPARATION OF COATED SUBSTRATES

As test panels different substrates have been used, namely substrates S1 (bare steel, degreased), S2 (steel substrates pretreated with a phosphatizing composition (Gardobond® GB26S 6800 OC)) and S3 (galvanized steel substrates pretreated with a phosphatizing composition (Gardobond® GB26S 6800 OG)). Prior to coating said substrates with the electrocoating materials, a strip was cut off at an edge of substrate S1 using tin snips. Before pretreatment of substrates S2 and S3, said substrates were punched to result in seven individual holes. These holes and its edges, respectively, were not sanded or polished, meaning that they resemble respective non-sanded/polished edges of real-life substrates.

The electrocoating materials ECM-1 to ECM-8 prepared according to point 3 are aged at room temperature with stirring for 24 h, respectively. The electrocoat materials are then each deposited on substrates S1 to S3 connected as cathodes within 2 to 3 minutes at a bath temperature of 32 to 33° C., rinsed with deionized water and baked in an oven at 175° C. (oven temperature) for 25 minutes (oven time). In case of substrate S1, a deposition voltage of 140 to 160 V was used while the electrocoating materials on substrates S2 and S3 were deposited using 140 to 260 V.

5. RESULTS

The corrosion resistance, especially the edge corrosion resistance, the surface roughness as well as the film build of the cured electrocoating material prepared according to point 4 was determined as described in points 1.7 to 1.10 above. The results are listed in the following Tables 5 to 7.

TABLE 5

Results for electrocoating materials ECM-1 and ECM-2 (values in the table represent the average values) on substrates S1 and S2

| | | | SST 504 h on substrate S1 Corrosion | SST 1008 h on substrate S2 | VDA1 10 cycles on substrate S2 | |
|---|---|---|---|---|---|---|
| | Film build [µm][1] | Roughness [µm][1] | creep cut edge [mm] | edge of holes [rating] | Edge of holes [rating] | Edge of panel [rating] |
| ECM-1 | 20.9 | 0.92 | 6.7 | 1.67 | 1.7 | 0.3 |
| ECM-2* | 20.5 | 0.68 | 6.1 | 0.67 | 1.0 | 0.3 |

*inventive
[1]determined on substate S2

TABLE 6

Results for electrocoating materials ECM-3 to ECM-6 (values in the table represent the average values) on substrates S1 and S2

| | | | SST 504 h on substrate S1 | | SST 1008 h on substrate S2 | VDA1 10 cycles on substrate S2 |
|---|---|---|---|---|---|---|
| | Film build [µm][1] | Roughness [µm][1] | Corrosion creep cut edge [mm] | Scribe corrosion [mm] | Edge of holes [rating] | Scribe corrosion [mm] |
| ECM-3 | 20.3 | 1.36 | 4.1 | 2.9 | 1.6 | 2.0 |
| ECM-4* | 19.8 | 0.77 | 4.2 | 2.7 | 1.8 | 1.7 |
| ECM-5* | 19.8 | 1.07 | 2.3 | 2.3 | 0.6 | 1.5 |
| ECM-6* | 19.6 | 0.88 | 3.4 | 2.8 | 0.6 | 2.0 |

*inventive
[1]determined on substate S2

TABLE 7

Results for electrocoating materials ECM-3 and ECM-5 to ECM-8 (values in the table represent the average values) on substrates S1 and S2

| | Roughness (20 µm film build) | | | SST 504 h on substrate S1 | | VDA2 12 cycles on substrate S2 | |
|---|---|---|---|---|---|---|---|
| | On substrate S1 | On Substrate S2 | On substrate S3 | Corrosion creep cut edge [mm] | Scribe corrosion [mm] | Edges of holes [rating] | Scribe corrosion [mm] |
| ECM-3 | 1.43 | 1.35 | 1.82 | 4.7 | 3.4 | 1.8 | 7.8 |
| ECM-5* | 1.00 | 1.13 | 1.29 | 4.2 | 3.4 | 1.4 | 5.8 |
| ECM-6* | 0.99 | 0.95 | 0.99 | 3.7 | 3.0 | 1.4 | 5.7 |
| ECM-7* | 0.79 | 0.94 | 1.25 | 4.4 | 3.0 | 1.2 | 6.6 |
| ECM-8* | 0.80 | 0.95 | 1.13 | 3.7 | 2.5 | 2.2 | 6.4 |

*inventive

6. DISCUSSION OF THE RESULTS

The use of inventive aqueous dispersions (AD) containing a cationic resin comprising different amounts of covalently attached polyvinyl alcohol polymer groups (ECM-2 and ECM-4 to ECM-8) results in reduced surface roughness as well as comparative or even improved edge corrosion protection of substrates coated with aqueous coating materials comprising said aqueous dispersion as compared to coating materials not comprising the inventive dispersions (AD) (ECM-1 and ECM-3) (see Tables 5 to 7). Without wishing to be bound to this theory, it is believed that the polyvinyl alcohol polymer covalently attached to the cationic epoxy microgel acts as a physical anchor function to the pigment rich layer, thereby fixing the cationic microgel to said layer and resulting in a high film thickness at the edges of the substrate. Additionally, the anchor function keeps the cationic microgel inside the formed coating layer such that a certain stratification having a low viscous melt layer at the coating surface is formed, said stratification being necessary for good flow and levelling properties.

The invention claimed is:

1. An aqueous dispersion comprising cationic polymer particles (AD), said aqueous dispersion (AD) being obtained by:
   a) preparing an aqueous dispersion of intermediate (I1) by reacting a compound (C1) comprising at least one free isocyanate group and at least two epoxide groups with
      (i) an aqueous solution of polyvinyl alcohol polymer (C2a-i) or
      (ii) a dispersion of polyvinyl alcohol polymer in an organic solvent S1 (C2a-ii) and subsequent dispersion of intermediate (I1) in water;
   b) reacting the aqueous dispersion of intermediate (I1) obtained in step (a) with a compound (C3) comprising at least one epoxide group and at least two blocked primary amino groups;
   c) optionally diluting the aqueous dispersion with an aqueous solution; and
   d) optionally at least partially removing organic solvents present in the dispersion obtained in step (c), wherein at least one acid is present in step a) and/or step b) and/or step c).

2. The aqueous dispersion according to claim 1, wherein compound (C1) is obtained by reacting at least one compound (C1-1) comprising at least two epoxide groups with at least one compound (C1-2) comprising at least one amine group and the resulting product is further reacted with at least one compound (C1-3) containing at least two free isocyanate groups.

3. The aqueous dispersion according to claim 1, wherein the polyvinyl alcohol polymer is a copolymer of vinyl alcohol and at least one ethylenically unsaturated monomer.

4. The aqueous dispersion according to claim 1, wherein the polyvinyl alcohol polymer has a fraction of vinyl alcohol of 50 to 99.9 mol %.

5. The aqueous dispersion according to claim 1, wherein the polyvinyl alcohol polymer has a viscosity at 20° C. of at least 2 mPa*s, as determined at a concentration of 4 wt. % in water according to DIN 53015:2018-07.

6. The aqueous dispersion according to claim 1, wherein the polyvinyl alcohol polymer has a degree of hydrolysis of 70 to 100 mol %.

7. The aqueous dispersion according to claim 1, wherein the aqueous solution (C2a-i) comprises 5 to 15 wt. % polyvinyl alcohol polymer, and 85 to 95 wt. % of water, based in each case on the total weight of the aqueous solution (C2a-i).

8. The aqueous dispersion according to claim 1, wherein compound (C3) is obtained by reacting at least one compound (C3-1) comprising at least one epoxide group with at least one compound (C3-2) comprising at least one aromatic group and at least two hydroxyl groups in the presence of at least one solvent S2 and the resulting product is further reacted with at least one polyamine (C3-3) comprising at least two blocked primary and at least one free secondary amino group.

9. The aqueous dispersion according to claim 1, wherein the at least one acid is selected from the group consisting of organic acids.

10. The aqueous dispersion according to claim 1, wherein the polymer particles have an average particle size (z-mean) of 100 to 1,000 nm, as determined according to DIN EN ISO 22412:2018-09.

11. The aqueous dispersion according to claim 1, wherein the aqueous dispersion (AD) comprises the cationic polymer particles in a total amount of 15 to 40 wt. %, based on the total weight of the aqueous dispersion (AD).

12. A process for preparing an aqueous dispersion (AD) comprising cationic polymer particles, said process comprising the following steps:

(1) preparing an aqueous dispersion of intermediate (I1) by reacting a compound (C1) comprising at least one free isocyanate group and at least two epoxide groups with (i) an aqueous solution of polyvinyl alcohol polymer (C2a-i) or (ii) a dispersion of polyvinyl alcohol polymer in an organic solvent S1 (C2a-ii) and subsequent dispersion of intermediate (i1) in water;

(2) reacting the aqueous dispersion of intermediate (I1) obtained in step (1) with a compound (C3) comprising at least one epoxide group and at least two blocked primary amino groups;

(3) optionally diluting the aqueous dispersion with an aqueous solution; and (4) optionally at least partially removing organic solvents present in the dispersion obtained after step (3), wherein at least one acid is present in step (1) and/or step (2) and/or step (3).

13. An aqueous electrocoating material (ECM) comprising (A) at least one aqueous dispersion (AD) according to claim 1, (B) at least one further binder B being different from the cationic polymer particles contained in the aqueous dispersion (AD), (C) optionally at least one crosslinker (CL), (D) at least one pigment, (E) optionally at least one additive, and (F) optionally at least one catalyst.

14. A process for producing an at least partially coated substrate, said process comprising the following steps:

(a) at least partially contacting a substrate with the aqueous electrocoating material (ECM) according to claim 13;

(b) optionally rinsing the coating film formed in step (b) with an aqueous solution;

(c) curing the coating film formed after step (a) or optionally after step (b); and (d) optionally applying at least one further coating layer and curing said coating layer.

15. An at least partially coated substrate obtained by the process of claim 14.

16. The aqueous dispersion according to claim 1, wherein the polyvinyl alcohol polymer is a copolymer of vinyl alcohol and at least one ethylenically unsaturated monomer is selected from the group consisting of vinyl acetate, vinyl acetal, ethylene, propylene, and combinations thereof.

17. The aqueous dispersion according to claim 1, wherein the polyvinyl alcohol polymer has a fraction of vinyl alcohol of 60 to 99.9 mol %.

18. The aqueous dispersion according to claim 1, wherein the polyvinyl alcohol polymer has a viscosity at 20° C. of at least 2 to 60 mPa*s.

19. The aqueous dispersion according to claim 1, wherein the polyvinyl alcohol polymer has a degree of hydrolysis of 70 to 95 mol %.

20. The aqueous dispersion according to claim 1, wherein the aqueous solution (C2a-i) comprises 5 to 10 wt. % polyvinyl alcohol polymer, and 90 to 95 wt. % of water, based in each case on the total weight of the aqueous solution (C2a-i).

\* \* \* \* \*